US010762534B1

(12) United States Patent
Blanchard et al.

(10) Patent No.: US 10,762,534 B1
(45) Date of Patent: Sep. 1, 2020

(54) MOTION DATA BASED CONSUMER INTERFACES

(71) Applicant: Groupon, Inc., Chicago, IL (US)

(72) Inventors: John Blanchard, Issaquah, WA (US); Vinayak Hegde, Bellevue, WA (US); Daidrie Berry, Seattle, WA (US); Jairo Da Silva, Santiago (CL); Juan Pablo Podlech, Santiago (CL); Michael Merz, Bellevue, WA (US); Ricardo Buquet, Santiago (CL)

(73) Assignee: Groupon, Inc., Chicago, IL (US)

( * ) Notice: Subject to any disclaimer, the term of this patent is extended or adjusted under 35 U.S.C. 154(b) by 759 days.

(21) Appl. No.: 14/980,678

(22) Filed: Dec. 28, 2015

Related U.S. Application Data

(60) Provisional application No. 62/097,536, filed on Dec. 29, 2014.

(51) Int. Cl.
*G06Q 30/02* (2012.01)
*G06F 3/01* (2006.01)

(52) U.S. Cl.
CPC ......... *G06Q 30/0267* (2013.01); *G06F 3/017* (2013.01)

(58) Field of Classification Search
USPC .......................................................... 705/14
See application file for complete search history.

(56) References Cited

U.S. PATENT DOCUMENTS

| 2010/0053322 A1* | 3/2010 | Marti | G06F 3/011 |
| | | | 348/135 |
| 2013/0196293 A1* | 8/2013 | Wood | G09B 5/06 |
| | | | 434/169 |
| 2013/0238287 A1* | 9/2013 | Hoffman | A63B 24/0062 |
| | | | 702/189 |
| 2013/0346170 A1* | 12/2013 | Epstein | G06Q 30/02 |
| | | | 705/14.14 |
| 2014/0073391 A1* | 3/2014 | Lin | G07F 17/3209 |
| | | | 463/16 |

(Continued)

OTHER PUBLICATIONS

An Adaptive Approach to Exergames with Support for Multimodal Interfaces, Juan Manuel Silva Salmerón (Year: 2013).*

(Continued)

*Primary Examiner* — Gautam Ubale
(74) *Attorney, Agent, or Firm* — Alston & Bird LLP

(57) ABSTRACT

Systems, apparatus, methods, and non-transitory media for consumer interfaces that are responsive to motion data are discussed herein. Some embodiments may include a system with one or more servers. The one or more servers may be configured to generate a consumer interface including a representation of an object that is responsive to the motion data generated by a motion sensor of a consumer device. The consumer interface may be provided to the consumer device to create the motion data and determine a motion data score. The motion data score may be used to determine promotion data parameters that define the terms of offered promotions. Promotion data parameters may be determined based on motion data performance in combination with consumer account data for programmatic relevance determination. Furthermore, the motion data received from the consumer device may be used to determine consumer account data or profile data.

21 Claims, 10 Drawing Sheets

(56) References Cited

U.S. PATENT DOCUMENTS

| | | | | |
|---|---|---|---|---|
| 2014/0125590 A1* | 5/2014 | Flagg | .................. | G06F 3/017 |
| | | | | 345/157 |
| 2014/0364202 A1* | 12/2014 | Harms | .................. | A63F 13/69 |
| | | | | 463/29 |
| 2015/0058140 A1* | 2/2015 | Dixon | .................. | G06Q 30/0277 |
| | | | | 705/14.73 |

OTHER PUBLICATIONS

Extending Sensing Capabilities and Modalities of Mobile Devices, Rohit Chaudhri (Year: 2014).*

* cited by examiner

US 10,762,534 B1

MOTION DATA BASED CONSUMER INTERFACES

CROSS-REFERENCE TO RELATED APPLICATIONS

This application claims the benefit of U.S. Provisional Application No. 62/097,536, titled "Motion Data Based Consumer Interfaces," filed Dec. 29, 2014, which is incorporated by reference herein in its entirety.

FIELD

Embodiments of the invention relate, generally, to techniques for providing real-time electronic data based on mobile consumer device motion.

BACKGROUND

Promotional systems provide promotional data and other merchant information to consumer devices. The functionality and interface designs used to present such offers can affect the frequency and quality of consumer interaction with the promotional system. Mobile devices are typically designed to facilitate mobility, which both limits and informs the types of hardware that may be used. For example, mobile devices such as smartphones may include small, touch screen displays for presenting information and receiving user inputs. Furthermore, they may include motion sensors which capture the movements (e.g., changes in position, orientation, etc.) of the mobile device. As such, interface manipulations and other functionalities that are suitable for stationary desktop devices may be unsuitable for mobile devices, and/or fail to leverage available mobile device inputs to optimize the interface functionalities (e.g., reduced number of consumer inputs required for complex interactions/data manipulations). In this regard, areas for improving current techniques have been identified. Through applied effort, ingenuity, and innovation, solutions to improve such systems have been identified and are described in detail below.

BRIEF SUMMARY

Some embodiments may provide for a system configured to provide improved consumer interfaces to consumer devices that are responsive to motion data generated by the consumer devices. The system may include one or more servers with communication circuitry configured to connect with consumer devices and merchant devices via a network. The one or more servers may further include processing circuitry configured to: generate a consumer interface including a representation of an object that is responsive to the motion data generated by a motion sensor of a consumer device; provide the consumer interface to the consumer device via the network; determine a motion data objective; receive the motion data from the consumer device via the network; determine a motion data score based on the motion data, wherein the motion data score indicates a level of completion of the motion data objective by the motion data; determine a promotion data parameter of a promotion based on the motion data score and consumer account data associated with the consumer device, wherein the consumer account data is accessed from a consumer database and associated with the consumer device based on the consumer device providing login data to the central system via the network; and provide an electronic marketing communication of the promotion to the consumer device via the network.

In some embodiments, the motion sensor may include one or more of a six-axis gyroscope accelerometer or a three axis gyroscope. The motion data may indicate a rotational motion of the consumer device. The object that is responsive to the motion data generated by the motion sensor may move within the consumer interface based on the rotational motion of the consumer device.

In some embodiments, the motion data objective may include moving the object toward a goal represented in the consumer interface. The motion data score may indicate a distance of the object from the goal.

In some embodiments, the motion data objective may include moving the object to one of a plurality of selection options represented in the consumer interface. The motion data score may indicate whether the object has been moved one of the plurality of selection options.

In some embodiments, the motion sensor may include one or more of: a six-axis gyroscope accelerometer; or a three axis accelerometer. The motion data may indicate a directional motion of the consumer device. The object that is responsive to the motion data generated by the motion sensor moves within the consumer interface based on the directional motion of the consumer device.

In some embodiments, the motion data objective may include moving the object to one of a plurality of selection options represented in the consumer interface. The motion data score may indicate whether the object has been moved one of the plurality of selection options.

In some embodiments, the motion data objective may include moving the object one or more locations represented in a map display of the consumer interface. The motion data score indicates whether the object has been moved to the one or more locations.

In some embodiments, the motion sensor may include a six-axis gyroscope accelerometer. The motion data may indicate a directional motion and a rotational motion of the consumer device. The object that may be responsive to the motion data generated by the motion sensor moves within the consumer interface based on the directional motion and the rotational motion of the consumer device.

In some embodiments, the processing circuitry may be further configured to: determine a motion data score threshold that must be satisfied to complete the motion data objective; determine whether the motion data score satisfies the motion data objective; and subsequent to determining that the motion data score satisfies the motion data objective, provide the electronic marketing communication of the promotion to the consumer device via the network.

In some embodiments, the processing circuitry may be further configured to: determine second consumer account data based on the motion data; and determine a second promotion data parameter associated with a second promotion based on the second consumer account data.

In some embodiments, the promotion data parameter may define one or more of: an item associated with the promotion; an accepted value of the promotion; or a promotional value of the promotion.

Some embodiments may provide for a machine-implemented method, including: generating, by processing circuitry of one or more servers configured to connect with consumer devices via a network, a consumer interface including a representation of an object that is responsive to the motion data generated by a motion sensor of a consumer device; providing, by the processing circuitry and via the network, the consumer interface to the consumer device; determining, by the processing circuitry, a motion data objective; receiving, by the processing circuitry and via the network, the motion data from the consumer device; determining, by the processing circuitry, a motion data score based on the motion data, wherein the motion data score indicates a level of completion of the motion data objective by the motion data; determining, by the processing circuitry, a promotion data parameter of a promotion based on the motion data score and consumer account data associated with the consumer device, wherein the consumer account data is accessed from a consumer database and associated with the consumer device based on the consumer device providing login data to the central system via the network; and providing, by the processing circuitry, an electronic marketing communication of the promotion to the consumer device via the network.

In some embodiments, the motion sensor may include one or more of: a six-axis gyroscope accelerometer; or a three axis gyroscope. The motion data may indicate a rotational motion of the consumer device. The object that is responsive to the motion data generated by the motion sensor may move within the consumer interface based on the rotational motion of the consumer device.

In some embodiments, the motion data objective may include moving the object toward a goal represented in the consumer interface. The motion data score may indicate a distance of the object from the goal.

In some embodiments, the motion data objective may include moving the object to one of a plurality of selection options represented in the consumer interface. The motion data score may indicate whether the object has been moved one of the plurality of selection options.

In some embodiments, the motion sensor may include one or more of: a six-axis gyroscope accelerometer; or a three axis accelerometer. The motion data may indicate a directional motion of the consumer device. The object that is responsive to the motion data generated by the motion sensor may move within the consumer interface based on the directional motion of the consumer device.

In some embodiments, the motion data objective may include moving the object to one of a plurality of selection options represented in the consumer interface. The motion data score may indicate whether the object has been moved one of the plurality of selection options.

In some embodiments, the motion data objective may include moving the object one or more locations represented in a map display of the consumer interface. The motion data score may indicate whether the object has been moved to the one or more locations.

In some embodiments, the motion sensor may include a six-axis gyroscope accelerometer. The motion data may indicate a directional motion and a rotational motion of the consumer device. The object that is responsive to the motion data generated by the motion sensor may move within the consumer interface based on the directional motion and the rotational motion of the consumer device.

In some embodiments, the method may further include, by the processing circuitry: determining a motion data score threshold that must be satisfied to complete the motion data objective; determining whether the motion data score satisfies the motion data objective; and subsequent to determining that the motion data score satisfies the motion data objective, providing the electronic marketing communication of the promotion to the consumer device via the network.

In some embodiments, the method may further include, by the processing circuitry: determining second consumer account data based on the motion data; and determining a second promotion data parameter associated with a second promotion based on the second consumer account data.

In some embodiments, the promotion data parameter may define one or more of: an item associated with the promotion; an accepted value of the promotion; or a promotional value of the promotion.

Some embodiments may provide for a consumer device. The consumer device may include: communication circuitry configured to connect with a central system via a network; a motion sensor configured to generate motion data indicating motion of the consumer device; a display device; and processing circuitry configured to: generate a consumer interface including a representation of an object that is responsive to the motion data generated by the accelerometer; provide the graphical user interface to the display device; determine a motion data objective; receive the motion data from the motion sensor; manipulate the object within the graphical user interface based on the motion data; determine a motion data score based on the motion data, wherein the motion data score indicates a level of completion of the motion data objective by the motion data; provide, via the network, the motion data score to a central system; and subsequent to providing the motion data score to the central system, receive an impression of a promotion from the central system, the promotion defined by a promotion data parameter determined based on the motion data score and consumer account data associated with the consumer device, wherein the consumer account data is accessed from a consumer database and associated with the consumer device based on the consumer device providing login data to the central system via the network.

Some embodiments may include circuitry and/or media configured to implement the methods and/or other functionality discussed herein. For example, one or more processors, and/or other machine components may be configured to implement the functionality discussed herein based on instructions and/or other data stored in memory and/or other non-transitory computer readable media.

These characteristics as well as additional features, functions, and details of various embodiments are described below. Similarly, corresponding and additional embodiments are also described below.

BRIEF DESCRIPTION OF THE DRAWINGS

Figure 1:
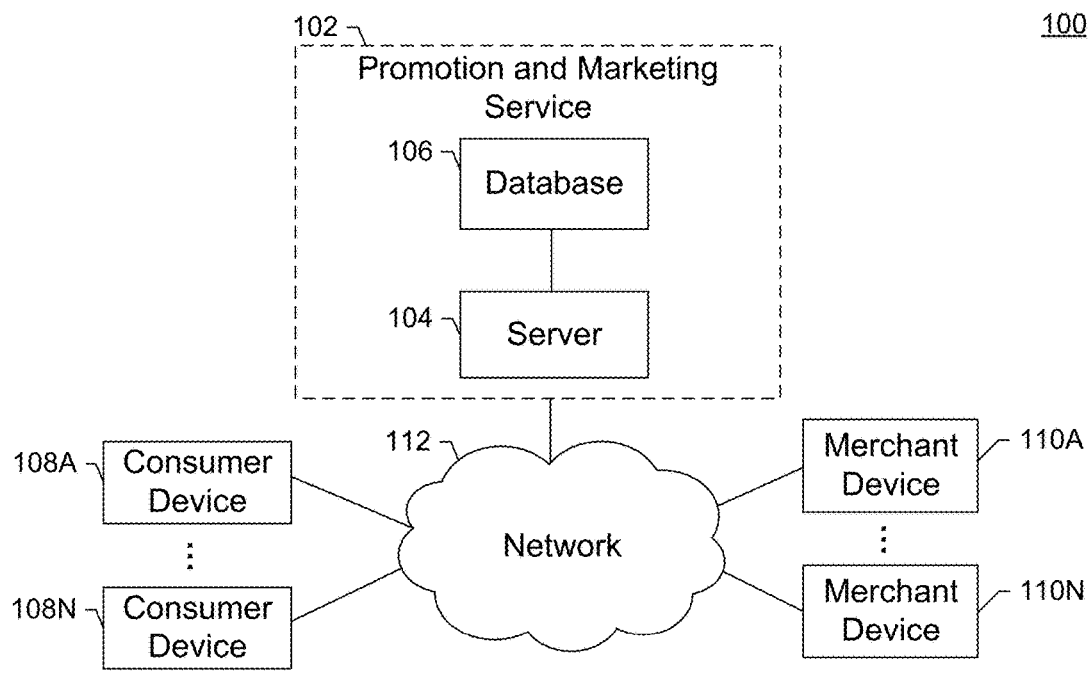
Figure 2:
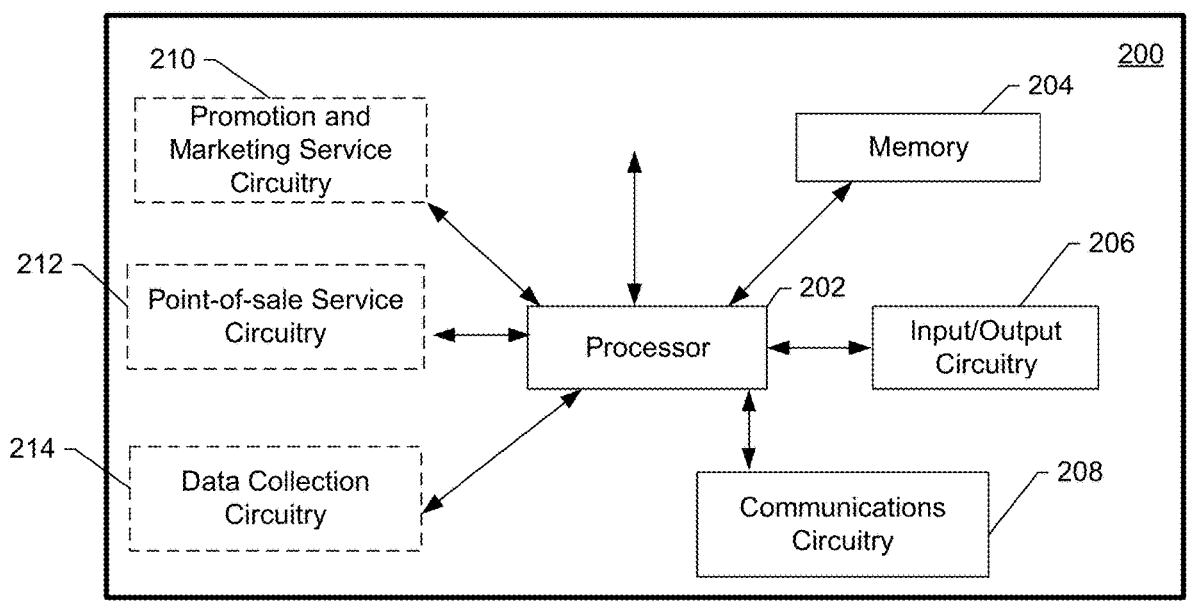
Figure 3:
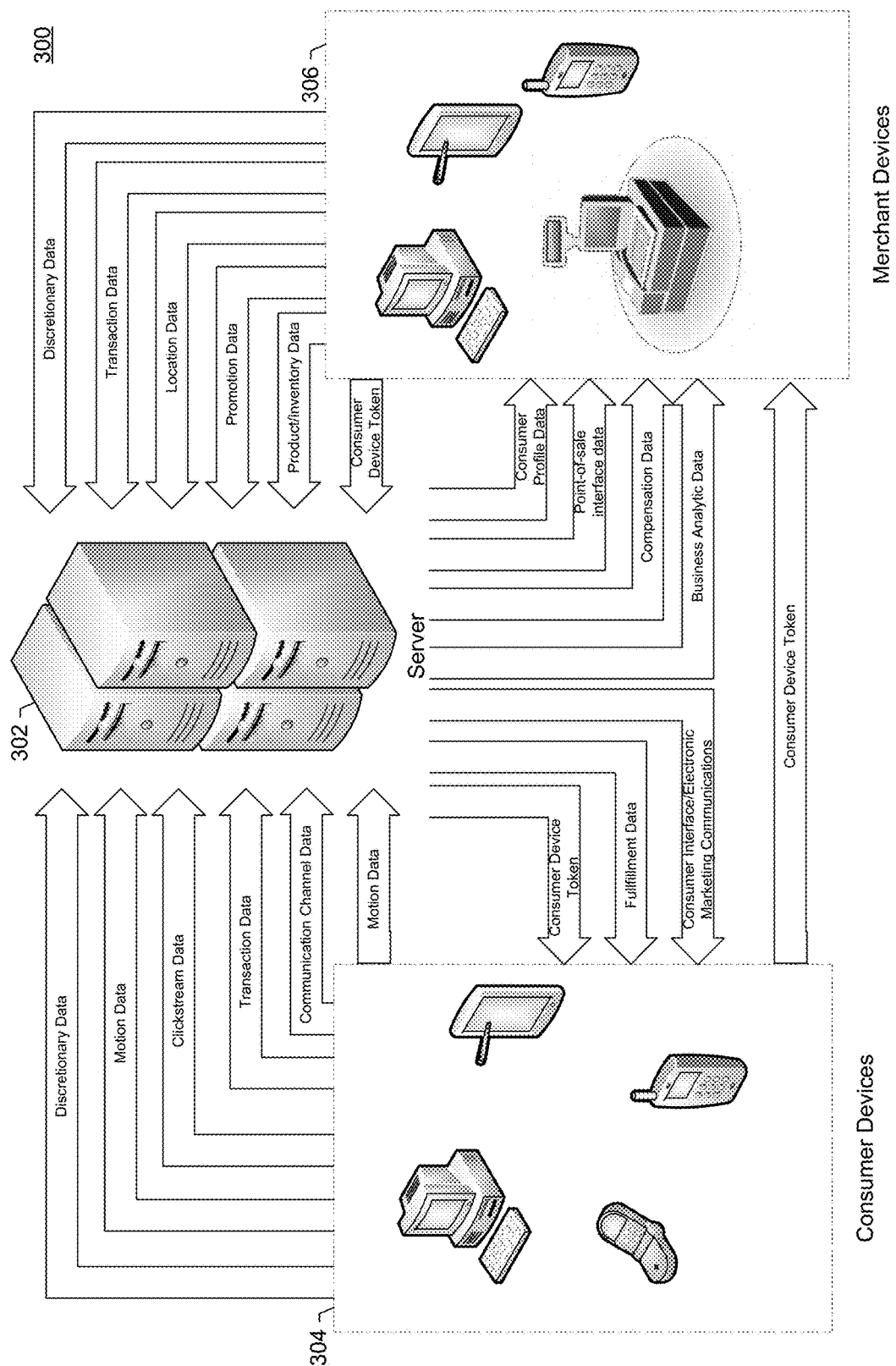
Figure 4:
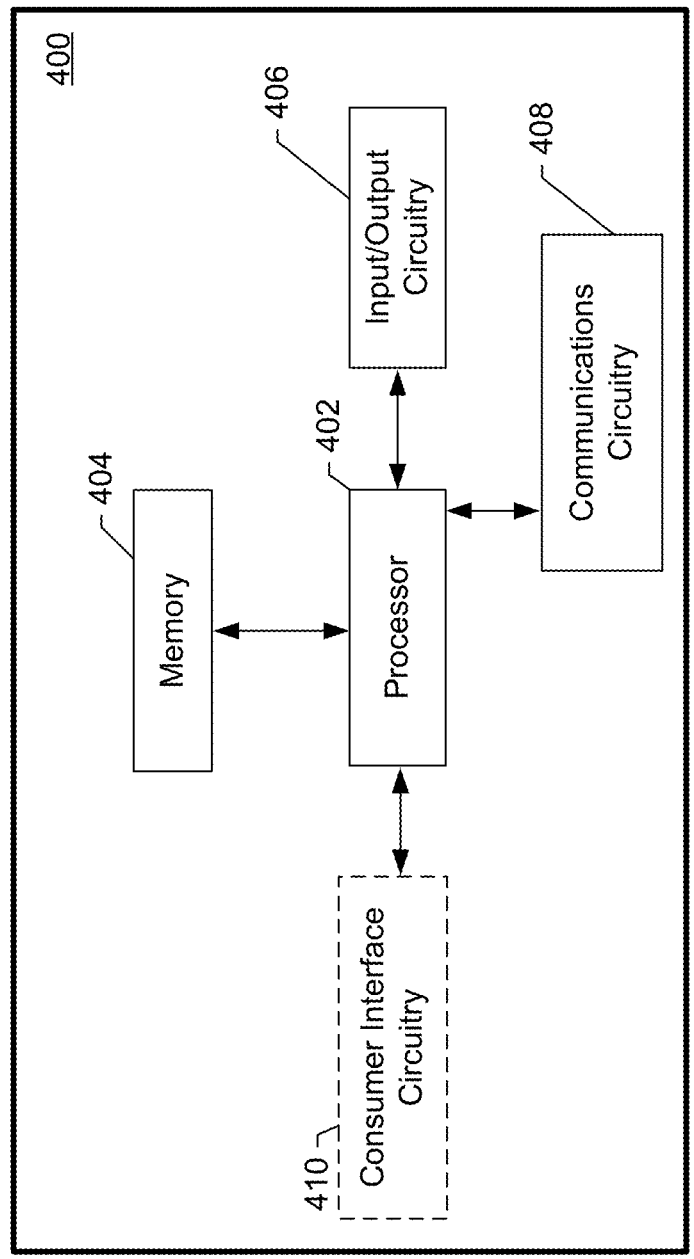
Figure 5:
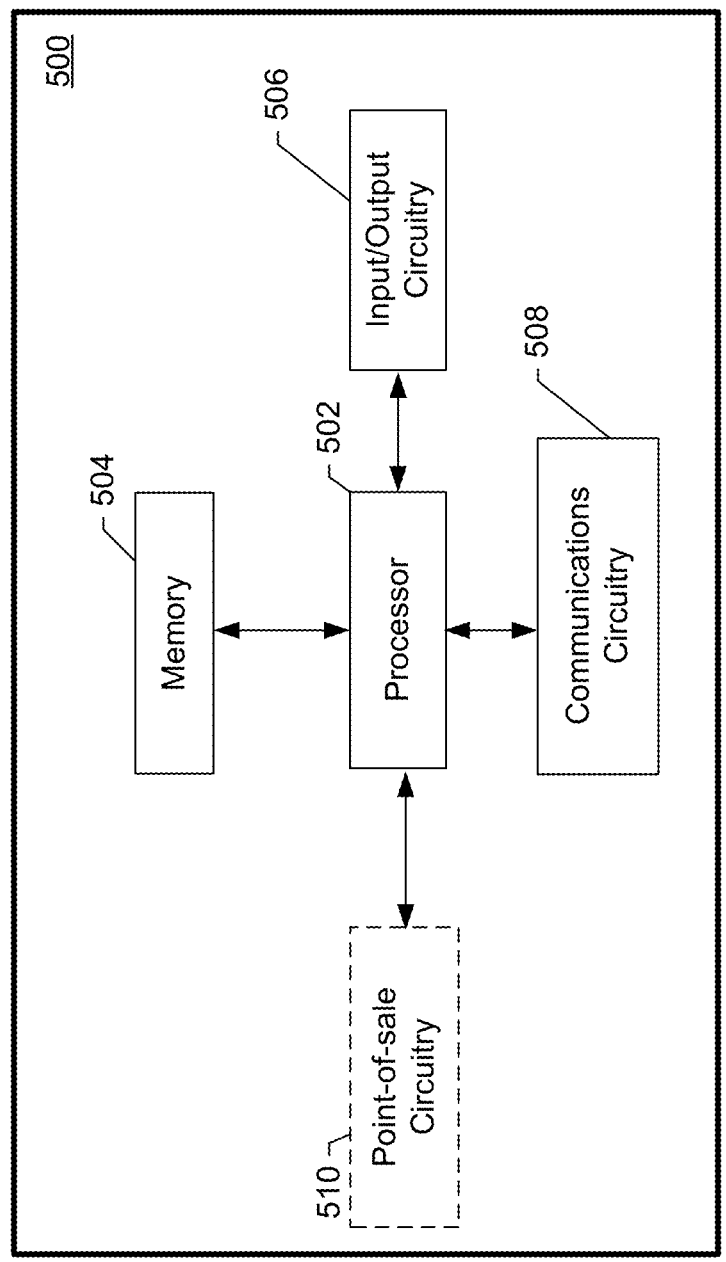
Figure 6:
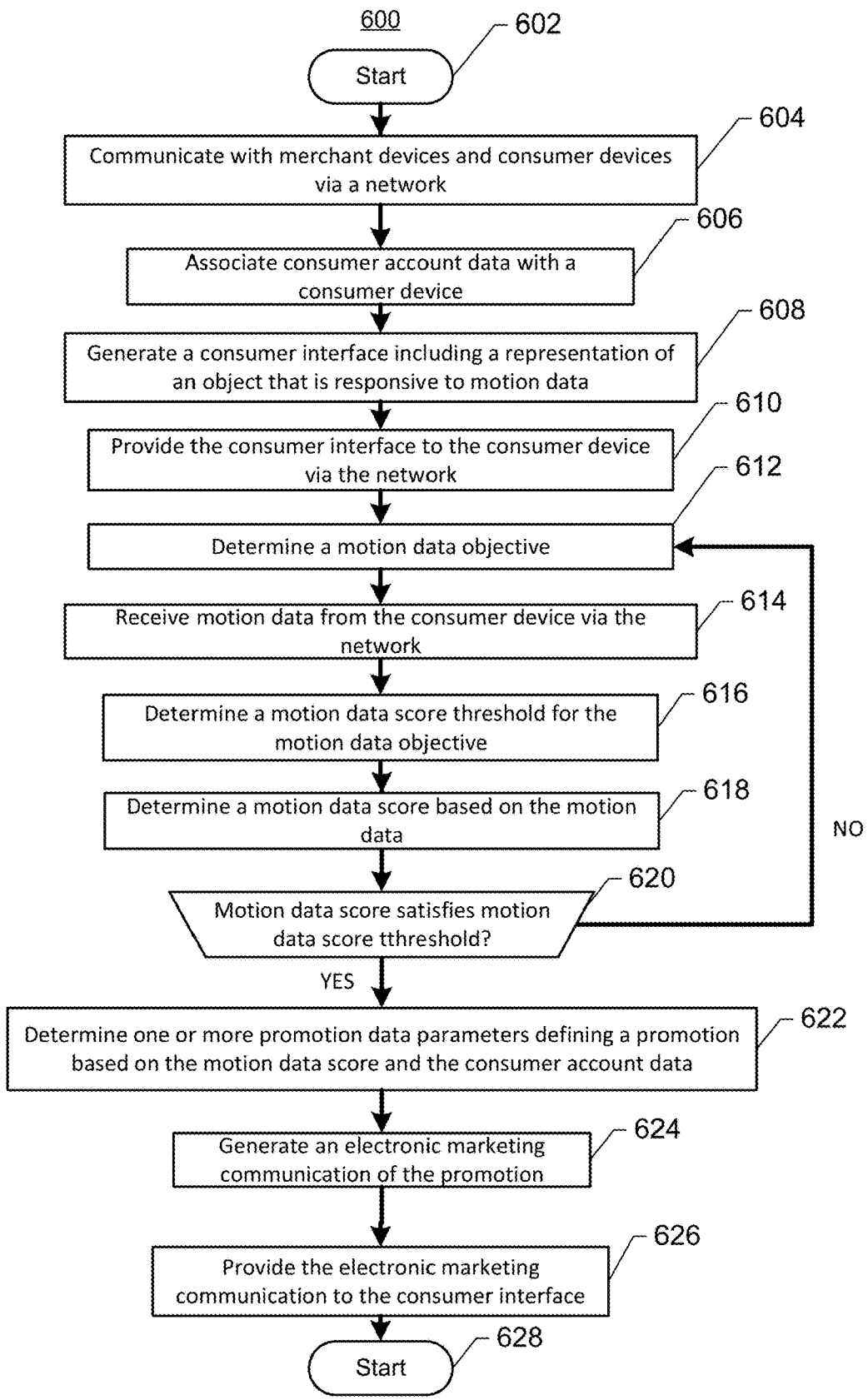

Having thus described some embodiments in general terms, reference will now be made to the accompanying drawings, which are not necessarily drawn to scale, and wherein:

FIG. 1 shows an example of a system configured in accordance with some embodiments;

FIG. 2 shows a schematic block diagram of example circuitry of a promotion and marketing service configured in accordance with some embodiments;

FIG. 3 depicts an example data flow illustrating interactions between a server, one or more consumer devices, and one or more merchant devices in accordance with some embodiments;

FIG. 4 shows a schematic block diagram of example circuitry of a consumer device configured in accordance with some embodiments;

FIG. 5 shows a schematic block diagram of example circuitry of a merchant device configured in accordance with some embodiments;

FIG. 6 shows a flowchart of an example of a method of determining promotion data parameters based on motion data performed in accordance with some embodiments; and FIGS. 7-11 show example consumer interfaces in accordance with some embodiments.

DETAILED DESCRIPTION

Some embodiments will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Overview

Some embodiments may provide for a system configured to facilitate improved mobile consumer device interactions. For example, the computing system may include one or more servers (e.g., of a central system) that are connected with merchant devices and consumer devices via a network (e.g., the Internet). The one or more servers and/or consumer device may be configured to provide a consumer interface. The consumer interface may provide for a novel game-based electronic marketing information communication channel through which promotion data can be provided to consumer devices. The consumer interface may include a representation of an object that is responsive to motion data (or other consumer device inputs) generated by the consumer device. In some embodiments, the consumer interface may take the form of a mobile application game, browser game, or other electronic game, with the displayed object being responsive to the motion data toward completion of a game objective. The game mechanics may be designed to be fun, challenging, rewarding, engaging and/or otherwise interesting to consumers to improve consumer participation with the electronic marketing communications.

In some embodiments, the consumer may be rewarded based the generated motion data relative to a goal or motion data objective. In an example of a lever tilting game, a consumer may be asked to move a lever from a start position to a goal position based on tilting the consumer device. In an example of a finders keepers game, a consumer may be required to move an avatar (e.g., a ball or other object) displayed on a virtual surface of the consumer interface from a start location to various objects by tilting the consumer device. In yet another example of a question-based game, the consumer may be allowed to select from displayed options or answer a displayed question (e.g., via selection of yes or no answer) by tilting or moving the consumer device. In yet another example of a scavenger hunt game, the consumer may be allowed to move a virtual representation of the consumer device to various locations based on the actual movement of the consumer device. As discussed in greater detail below, promotion data parameters such as the underlying item or associated discount may be determined based on motion data performance.

The promotion data parameters may be further determined based on consumer account data. The various games discussed herein may be further designed such that the received motion data inputs may be indicative of consumer account data indicating consumer interests, preferences, group membership, age, gender, etc. In that sense, the consumer interfaces discussed herein can engage consumers to facilitate the sharing of consumer information. Furthermore, game outcomes can be tied to promotional rewards to encourage information sharing and/or promotion purchases.

Definitions

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" or "PM service" may include a service that is accessible via one or more computing devices and that is operable to provide promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the PM service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

In some embodiments, the PM service may be further configured to present one or more promotions via one or more impressions, provide consumer interfaces to consumer devices configured to accept payments for promotions from consumers, issue instruments upon acceptance of an offer, participate in redemption, generate rewards, provide point-of-sale functionality (e.g., to a merchant device), issue payments to providers and/or or otherwise participate in the exchange of goods, services or experiences for currency, value and/or the like. A consumer interface may include an electronic user interface that can be provided to one or more computing devices (e.g., mobile consumer devices) and that is operable to provide an electronic, interactive electronic user interface to the consumer devices. The PM service may be connected with merchant devices and consumer devices via a network (e.g., the Internet). In some embodiments, the consumer interface may be configured to receive motion data consumer device inputs (e.g., from an accelerometer, gyroscope, and/or other motion sensor) that may be used to determine consumer completion of a motion data objective. Based at least in part on consumer performance via the consumer device inputs, the PM service may determine consumer account eligibility for promotions and/or promotion parameters. Furthermore, the PM service may gather electronic marketing information based on the consumer device inputs and may use the gathered information to build consumer profiles, determine consumer preferences, and/or promotion parameters (e.g., in addition or alternative to using consumer performance towards a motion data objective, which may take the form of a graphical user interface game or challenge presented on the consumer interface.

The PM service may also, in some example embodiments, be configured to offer merchant services such as promotion building (e.g., assisting merchants with selecting promotion data parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like.

As used herein, the term "motion data" refers to data indicative of movement of a device over time. Motion data may include data generated by a motion sensor of the consumer device, such as an accelerometer and/or gyroscope. For example, a consumer device may include one or more of a six-axis gyroscope accelerometer, a three axis accelerometer, a gyroscope, etc. In some embodiments, motion data may include location data indicating a location of the consumer device. The location data may be programmatically determined based on the motion data from a motion sensor, or in some embodiments, may alternatively or additionally determined based on other suitable techniques such as cell-tower triangulation, global positioning systems (GPS), internet protocol (IP) address, communication beacons, WiFi access point identification, near field communication, etc.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of a providing a good, service or experience to a consumer, facilitating the provision of a good, service or experience to a consumer and/or otherwise operating in the stream of commerce. The "provider" or "merchant" need not actually market a product or service via the promotion and marketing service, as some merchants or providers may utilize the PM service only for the purpose of gathering marketing information, demographic information, or the like, or receiving point-of-sale functionality.

As used herein, the term "consumer" should be understood to refer to a recipient of goods, services, promotions, media, or the like provided by the PM service and/or a merchant. Consumers may include, without limitation, individuals, groups of individuals, corporations, other merchants, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. A promotion may be defined by promotion data parameters, which may take on different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the PM service, where the PM service receives the cost value for each promotion sold to a consumer. The promotion may also include a "return on investment" value, representing a quantified expected return on investment to the merchant for each promotion sold.

For example, consider a promotion offered by the PM service for a $50 meal promotion for $25 at a particular restaurant. In this example, $25 would be the accepted value charged to the consumer. The consumer would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or PM service. This $22.50 would be the residual value of the promotion. If the PM service charged the merchant $3.00 to offer the promotion, the $3.00 fee would be the "cost value." The "return on investment" value of the promotion might be dynamically calculated by the PM service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion.

Promotions may be provided to consumers and redeemed via the use of an "instrument." Instruments may represent and embody the terms of the promotion from which the instrument resulted. For example, instruments may include, but are not limited to, any type of physical credential (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "redemption" refers to the use, exchange or other presentation of an instrument for at least a portion of a good, service or experience as defined by the instrument and its related promotion. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned restaurant as the example provider, is the exchange of the $50 instrument and $50 to settle a $100 meal check.

As used herein, the term "impression" refers to a metric for measuring how frequently consumers are provided with marketing information related to a particular good, service, or promotion. Impressions may be measured in various different manners, including, but not limited to, measuring the frequency with which content is served to a consumer (e.g., the number of times images, websites, or the like are requested by consumers), measuring the frequency with which electronic marketing communications including particular content are sent to consumers (e.g., a number of e-mails sent to consumers or number of e-mails including particular promotion content), measuring the frequency with which electronic marketing communications are received by consumers (e.g., a number of times a particular e-mail is read), or the like. Impressions may be provided through various forms of media, including but not limited to communications, displays, or other perceived indications, such as e-mails, text messages, application alerts, mobile applications, other type of electronic interface or distribution channel and/or the like, of one or more promotions.

As used herein, the term "electronic marketing information" refers to various electronic data and signals that may be interpreted by a PM service to provide improved electronic marketing communications. Electronic marketing information may include, without limitation, clickstream data (defined below), consumer tracking data (defined below), location data (defined below), communication channel data (defined below), discretionary data (defined below), real-time consumer device signals (defined below) or any other data stored by or received by the PM service for use in providing consumer interfaces and/or point-of-sale interfaces. In some embodiments, the electronic marketing information may further be used to provide electronic communications to consumers devices (e.g., within the consumer interface).

As used herein, the term "clickstream data" refers to electronic information indicating content viewed, accessed, edited, retrieved, or otherwise interacted with by consumers. This information may be electronically processed and analyzed by a PM service to improve the quality of electronic marketing and commerce transactions offered by, through, and in conjunction with the PM service. It should be understood that the term "clickstream" is not intended to be limited to mouse clicks. For example, the clickstream data may include various other consumer interactions, including without limitation, touch screen interactions, voice interactions, mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like. In some embodiments, clickstream data may further include motion data indicating movement of a consumer device and used to manipulate an object or other interactive element within a consumer interface, such as may be created by a motion sensor included with the consumer device. For example, the consumer interface may be configured to provide motion data objectives that facilitate the creation of clickstream data by consumers.

As used herein, the term "transaction data" refers to electronic information indicating that a transaction is occurring or has occurred via either a consumer device, merchant device, or the PM service. Transaction data may include information relating to the transaction. For example, transaction data may include consumer payment or billing information, consumer approval data (e.g., indicating consumer approval of a payment), consumer shipping information, items purchased by the consumer, a merchant rewards account number associated with the consumer, the type of shipping selected by the consumer for fulfillment of the transaction, or the like. In some embodiments, transaction data may include electronic data generated by merchant devices via merchant input to the point-of-sale interface provided by the PM service.

As used herein, the term "location data" refers to motion data that indicates a particular location. Location data may be associated with a consumer, a merchant, or any other entity capable of interaction with the PM service. For example, in some embodiments location data is provided by a location services circuitry, a location services module of a consumer mobile device, and/or location sensors (e.g., GPS, operating system location services, WiFi access point identification sensors, etc.) that are configured to generate electronic information or signals that are indicative of the context, position, or environment surrounding the consumer device. In some embodiments, location data may be provided by a merchant device to the PM system indicating the location of consumer devices within their retail location. In some embodiments, location data may be provided by merchant devices to indicate the current location of the merchant (e.g., a food truck or delivery service). It should be appreciated that location data may be provided by various systems capable of determining location information, including, but not limited to, global positioning service receivers, indoor navigation systems, cellular tower triangulation techniques, video surveillance systems, or radio frequency identification (RFID) location systems.

As used herein, the term "communication channel data" refers to electronic information relating to the particular device or communication channel upon which a merchant or consumer communicates with the PM service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the PM service), or any other data pertaining to the communication channel between the PM service and an entity external to the PM service.

As used herein, the term "discretionary data" refers to electronic information provided by a merchant or consumer explicitly to the PM service in support of improved interaction with the PM service. Upon registering with the PM service or at any time thereafter, the consumer or merchant may be invited to provide information that aids the PM service in providing services that are targeted to the particular needs of the consumer or merchant. For example, the discretionary data may include any suitable consumer information that can be used, such as consumer information related to health (e.g., undesirable ingredients such as allergy information, weight, blood pressure, etc.), habit information, consumer status, apparel size (e.g., shoe size, clothing size, etc.), color blindness, visual impairment, auditory impairment, price flexibility or price bands, transaction data (e.g., indicating past purchases), and/or environmental data (e.g., preferred weather, temperature, humidity, precipitation, etc.). A merchant may indicate the type of goods or services provided, their retail storefront location, ingredients or recipes for menu items, menu information, employee information, contact information, hours of operation, or the like.

It should be appreciated that the term "discretionary data" is intended to refer to information voluntarily and explicitly provided to the PM service, such as by completing a form or survey on a website or application hosted by the PM service. However, it should be appreciated that the examples of discretionary data provided above may also be determined implicitly or through review or analysis of other electronic marketing information provided to the PM service, including consumer device inputs used to determine clickstream data and promotion data parameters as discussed in greater detail herein. It should also be appreciated that the PM service may also gate access to certain features or tools based on whether certain discretionary data has been provided. For example, the consumer may be required to provide information relating to their interests or location during a registration process.

As used herein, the term "real-time consumer device signals" refers to electronic information generated by sensor circuitry of a consumer device. For example, the sensor circuitry may include one or more environmental sensors (e.g., temperature, humidity, etc.), biological sensors (e.g., thermometer, heart rate monitor), visual sensors (e.g., a front facing camera configured to capture consumer expressions and/or gestures), and/or motion sensors (e.g., accelerometer, gyroscope, etc). In some embodiments, one or more real-time consumer device signals may also be used to interact with a consumer interface, objective, and/or determine promotion data parameters.

As used herein, the term "promotion data parameters" or "offering parameters" refers to data that defines the promotion and/or terms and conditions under which a promotion is offered by a PM service to consumers. These offering parameters may include parameters, bounds, considerations and/or the like that outline or otherwise define the characteristics, terms, timing, constraints, limitations, rules or the like under which the promotion is sold, offered, marketed, or otherwise provided to consumers. Example promotion data parameters may include the "item" (e.g., underlying product or service of the promotion such as a particular menu item, a type of massage, etc.), the accepted value, the promotional value, the residual value, etc. Other examples may include parameters that define a total of 100 instruments to be issued, a run duration of when the promotion will be marketed via the PM service, and parameters for identifying consumers to be offered the promotion (e.g., factors influencing how consumer locations are used to offer a promotion).

As used herein, the term "redemption parameters" refers to terms and conditions for redeeming or otherwise obtaining the benefit of promotions obtained from a PM service. The redemption parameters may include parameters, bounds, considerations and/or the like that outline the term, timing, constraints, limitations, rules or the like for how and/or when an instrument may be redeemed. For example, the redemption parameters may include an indication that the instrument must be redeemed prior to a specified deadline, for a specific good, service or experience and/or the like. For example, using the aforementioned restaurant as the example provider, the redemption parameters may specify a limit of one instrument per visit, that the promotion must be used in store only, or that the promotion must be used by a certain date.

As used herein, the term "promotion content" refers to display factors or features that influence how the promotion is displayed to consumers. For example, promotion content may include an image associated with the promotion, a narrative description of the promotion or the merchant, a display template for association with the promotion, or the like. For example, merchant data indicators (defined below) may be used to identify promotion offers that were generated by merchants with similar characteristics to the merchant data indicators. Various other factors may be used to generate the promotion offer, such as the success of the promotion offers generated by the merchants with similar characteristics, the product availability of the merchant, and the like.

As used herein, the term "promotion component" is used to refer to elements of a particular promotion that may be selected during a promotion generation process. Promotion components may include any aspect of a promotion, including but not necessarily limited to promotion data parameters, offering parameters, redemption parameters, and promotion content. For example, promotion components may include, but are not limited to, promotion titles, promotion ledes (e.g., a short text phrase displayed under a promotion title), promotion images, promotion prices, promotion discount levels, promotion style sheets, promotion fonts, promotion e-mail subjects, promotion quantities, promotion fine print options, promotion fees assessed to the merchant by the PM service, or the like. Promotion components may also include various flags and settings associated with registration and verification functions for a merchant offering the promotion, such as whether the identity of the merchant has been verified, whether the merchant is registered with the PM service, or the like.

As used herein, the term "electronic marketing communication" refers to any electronically generated information content provided by the PM service to a consumer device for the purpose of marketing a promotion, good, or service to the consumer. Electronic marketing communications may include any email, short message service (SMS) message, web page, application interface, or the like electronically generated for the purpose of attempting to sell or raise awareness of a product, service, promotion, or merchant to the consumer. In some embodiments, the electronic marketing communication may take the forum of an electrical graphical consumer interface as discussed in greater detail herein.

It should be appreciated that the term "electronic marketing communication" implies and requires some portion of the content of the communication to be generated via an electronic process. For example, a telephone call made from an employee of the PM service to a consumer for the purpose of selling a product or service would not qualify as an electronic marketing communication, even if the identity of the call recipient was selected by an electronic process and the call was dialed electronically, as the content of the telephone call is not generated in an electronic manner.

However, a so-called "robo-call" with content programmatically selected, generated, or recorded via an electronic process and initiated by an electronic system to notify a consumer of a particular product, service, or promotion would qualify as an electronic marketing communication. Similarly, a manually drafted e-mail sent from an employee of the PM service to a consumer for the purpose of marketing a product would not qualify as an electronic marketing communication. However, a programmatically generated email including marketing materials programmatically selected based on electronic marketing information associated with the recipient would qualify as an electronic marketing communication.

As used herein, the term "business analytic data" refers to data generated by the PM service based on electronic marketing information to assist with the operation of the PM service and/or one or more merchant systems. The various streams of electronic marketing information provided to and by the PM service allow for the use of sophisticated data analysis techniques that may be employed to identify correlations, relationships, and other associations among elements of electronic marketing information. These associations may be processed and formatted by the PM service to provide reports, recommendations, and services both internal to the PM service and to merchants in order to improve the process by which merchants and PM service engage with consumers.

For example, the PM service may analyze the electronic marketing information to generate customized menu interfaces that facilitate consumer service. Based on the electronic marketing information, the PM service may generate menus that are relevant to real-time preferences, conditions or habits of the consumer. Furthermore, the PM service may identify an increased demand for a particular product or service, and provide an electronic report to a merchant suggesting the merchant offer the particular product or service, or update the menu interface to include, recommend, or otherwise present the particular product or service. In another example, the PM service may identify that a particular product or service is not selling or resulting in the merchant losing money, customers, or market share (e.g., after consumers order a particular menu item, they never come back to the merchant), and suggest that the merchant should discontinue offering that product or service or remove the product or service from the menu interface.

It should be appreciated that the term "business analytic data" is intended to refer to electronically and programmatically generated data. For example, a printed report or letter manually drafted by an employee of the service would not be said to include business analytic data, even if said data was used by the employee during the drafting process, while a data disk or downloaded file containing analytics generated by the PM service would be considered business analytic data. Human interaction requires time, resources, introduces errors, and is incapable of efficiently considering large data collections, and thus various embodiments discussed herein include solutions to some or all of these technical problems.

As used herein, "wallet identifying data," "digital consumer token" or "consumer device token" refers to a key, code, identifier, or the like, that uniquely identifies a consumer device and/or consumer account record. For example, consumer profiles and/or consumer information of a consumer account record may be associated with a digital consumer token. The digital consumer token may be passed from consumer devices to merchant devices, and used by the merchant devices to access consumer information associated with the digital consumer token (e.g., via an exchange with the PM service). As used herein, a "consumer account" or "consumer account record" refers to a record or collection of consumer information stored in one or more consumer account databases of the PM service.

Technical Underpinnings and Implementation of Exemplary Embodiments

Merchants, including manufacturers, wholesalers, and retailers, have spent a tremendous amount of time, money, manpower, and other resources to determine the best way to serve products and services to consumers. Whether a given consumer interaction is successful (at least from the merchant's perspective) is often determined based on the return-on-investment received to the merchant in terms of revenues, profits, and increased awareness of the merchant's goods and services when compared to the resources invested by the merchant to facilitate the consumer interaction. To this end, a merchant's financial resources may be spent in a variety of different manners including conducting market and consumer research, identifying consumers, tracking consumer preferences, purchases, behaviors, or habits, training employees, offering targeted products or services, advertising, offering of discounts, conducting market research, among other things. The end goal of these activities is to ensure that consumer information is programmatically leveraged during consumer and merchant interactions while minimizing the expense of the effort.

The advent of electronic commerce has revolutionized the marketing process. While merchants would typically have to perform costly market research such as focus groups, surveys, and the like to obtain detailed information on consumer preferences and demographics, the digital age has provided a wealth of new consumer information that may be used to optimize the point-of-sale process. As a result, new technologies have been developed to gather, aggregate, analyze, and report information from a variety of electronic sources.

Various embodiments discussed herein may provide for consumer interfaces that facilitate the acquisition of so-called "clickstream data" or "electronic marketing data." Such data provides a robust set of information describing the various interactions consumers have with electronic marketing information provided to them by merchants and others. The PM service may be developed with sophisticated technologies that are configured to receive and process this data for the benefit of both merchants and consumers. The PM service may assist merchants with marketing or otherwise presenting their products to interested consumers, while reducing the chance that a consumer will be presented with marketing or menu information in which the consumer has no interest. The PM service may further leverage its access to the trove of electronic marketing information to assist merchants and consumers with other tasks, such as offering improved consumer profile and information management, improved merchant inventory and supply chain management, improved point-of-sale interfaces and menu displays, improved methods for delivering products and services, improved consumer interfaces for interacting with merchant data via consumer devices, and the like.

Unlike conventional techniques related to the use of paper or other physical media (e.g., paper menus or merchant listings), the PM service may offer a wealth of additional electronic solutions to improve the experience for consumers and merchants. The ability to closely monitor consumer interactions (e.g., with consumer interfaces and/or impressions, motion data, transactions data generated at merchant locations, location data indicating consumer location, etc.)

provides the ability for the PM service to gather data related to the time, place, and manner in which consumers engaged with the electronic data (e.g., completed or attempted a motion data objective and/or other game application objective, viewed, clicked, provided a payment via a consumer device, approved a payment via a communication with a merchant device, moused-over an impression and obtained and redeemed the promotion, etc.). The PM service may use this information to determine which merchants, products, and services are most relevant to the consumer's interest, and to provide improved consumer interfaces (e.g., including materials related to said products and services) to consumer devices and/or consumer interfaces designed to gather additional, useful, or needed data, thus improving the efficiency of the electronic marketing communications received by the consumer device. Advantageously, the techniques discussed herein provides for increased efficiency of network based communications through targeting of electronic data based on relevance. Similarly, electronic data that is less relevant or not relevant to the consumer is not sent via the network to the consumer interfaces, thereby reducing system processing requirements and network congestion, and increasing throughput of relevant electronic data via the network. In some embodiments, the PM service may additionally or alternatively use this information to generate point-of-sale interfaces and menu displays that are targeted to the consumer, thus improving the quality a consumer's experience at a merchant shop.

Although electronic marketing information provides a wealth of information, the inventors have determined that existing techniques may not always leverage or process this information in an efficient or accurate manner. Furthermore, existing techniques are limited in the ways that the electronic marketing information may be generated by consumer devices. Technology continues to rapidly advance in the field of analytics and the processing of this information, offering improved data gathering and analysis techniques, resulting in more relevant and accurate results provided in a more efficient manner. Promotion and marketing services continue to evolve and provide improved methods for engaging consumers and spreading awareness of products offered by the services.

In many cases, the inventors have determined that these services are constrained by technological obstacles unique to the electronic nature of the services provided, such as constraints on data storage, network resources, machine communication, interoperability, and processor resources. The inventors have identified that the wealth of electronic data available to these services and the robust nature of promotion and marketing techniques present new data, network, and communication challenges never contemplated in the world of paper menus and physical marketing techniques (e.g., paper coupons). The inventors have further determined that even technological methods that leverage computers for statistical analysis and consumer behavior modeling (e.g., television rating systems) fail to address problems associated with providing relevant, high quality consumer interfaces in a manner that maximizes accuracy, minimizes error, is user friendly and provides for efficient allocation of resources. Embodiments of the present invention as described herein serve to correct these deficiencies and offer improved resource utilization, thus providing improvements to electronic consumer interface services that address problems arising out of the electronic nature of those services.

Advantageously, the consumer interfaces discussed herein may provide for improvements in the quantity and quality of electronic marketing data received from consumer interactions on consumer devices. For example, the level of consumer engagement can be improved by providing game interfaces that are interesting, challenging, rewarding, or otherwise engaging to consumers. The consumers may be motivated to engage the improved consumer interfaces for greater periods of time, for repeated sessions, via inviting friends or participating in other networked social functionality, thereby increasing overall consumer engagement with the PM service. The consumer interactions provided via the consumer interface can provides additional signals as to a consumer's behavior, interest, etc. that may be leveraged for relevance-based matching, thereby facilitating effective data acquisition and training of machine-based learning systems. Furthermore, consumers may be provided with opportunities to purchase promotions based on completion of game objectives to further drive engagement with the consumer interfaces and PM service.

System Architecture and Example Apparatus

Methods, apparatuses, and computer program products of the present invention may be embodied by any of a variety of devices. For example, some embodiments may include a networked device, such as one or more servers or other network entity, configured to communicate with one or more devices, such as one or more client devices. A client device may include a fixed computing device, such as a personal computer or a computer workstation. In another example, a client device may include a mobile terminals, such as a portable digital assistant (PDA), mobile telephone, wearable device, smart watch, electronic eyewear, smartphone, laptop computer, tablet computer, or any combination of the aforementioned devices.

In this regard, FIG. 1 shows an example computing system 100 within which embodiments of the present invention may operate. System 100 may include promotion and marketing (PM) service 102 including one or more servers 104 and one or more database 106. PM service 102 may be connected with client devices via network 112 (e.g., the Internet), such as consumer devices 108A-108N and merchant devices 110A-110N. The consumer devices 108A-108N may each be associated with different consumer accounts, such as based on PM service receiving login data (e.g., username, password, biometric identifier, etc.) associated with the consumer accounts from the consumer devices. In some embodiments, consumer devices 108A-108N may be mobile devices such as smartphones that can be readily carried by the consumer while remaining (e.g., at least intermittently) in communication with the PM service 102 via network 112.

Server 104 may be a single server or may be multiple (e.g., distributed) servers, and may provide for the receiving of electronic data from various sources, including but not necessarily limited to the consumer devices 108A-108N and the merchant devices 110A-110N. For example, the server 104 may be operable to receive and process electronic marketing information provided by the consumer devices 108 and/or the merchant devices 110. The server 104 may also facilitate e-commerce transactions based on transaction information provided by the consumer devices 108 and/or the merchant devices 110. For example, server 104 may generate a consumer interface configured to interact with motion data generated by a consumer as discussed herein to provide improved electronic marketing communications to consumer devices as discussed in further detail below. In some embodiments, the server 104 may further facilitate the generation and providing of various point-of-sale interfaces and menu displays, or the generation and providing of electronic communications and marketing materials based on interactions performed via the point-of-sale interfaces.

The database 106 may be embodied as one or more data storage devices such as a Network Attached Storage (NAS) device or devices, or as a separate database server or servers. The database 106 may include consumer data and/or merchant data accessed and stored by the server 104 to facilitate the operations of the PM service 102. In some embodiments, consumer data associated with consumer account records may be stored in one or more consumer databases and merchant data associated with merchants may be stored in one or more separate merchant database. In some embodiments, the database 106 may include, without limitation, consumer account credentials for system administrators, one or more consumer profiles and related data (e.g., consumer preferences, information sharing rules, etc.), associations between consumer profiles and consumer identifying tokens, merchants, and consumers, data indicating the products and promotions offered by the PM service, menu item data, inventory data, employee information (e.g., skills, specializations, organizational role, shift or payroll data, background or employee profile information, etc.) clickstream data, transaction data, discretionary data, analytic results, reports, financial data, and/or the like.

The consumer devices 108A-108N may include computing device that are associated with and/or operated by a consumer. Electronic data received by the server 104 from the consumer devices 108A-108N may be provided in various forms and via various methods. As discussed above, a consumer device 108 may be a mobile device, such as a smart phone or tablet, the consumer device 108 may execute a mobile device application (an "app" or "mobile app") to interact with the PM service 102. Such apps are typically designed to execute on mobile devices, such as tablets or smartphones. For example, a mobile software application or "app" may be provided that executes on mobile device operating systems such as Apple Inc.'s iOS®, Google Inc.'s Android®, or Microsoft Inc.'s Windows 8®. These platforms typically provide operating system frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

The PM service 102 may leverage the application framework offered by the mobile operating system to allow consumers to designate which information is provided to the app and which information may then be provided to the PA service 102. In some embodiments, consumers may "opt in" to provide particular data to the PA service 102 in exchange for a benefit, such as improved relevancy of marketing communications offered to the user. In some embodiments, the consumer may be provided with privacy information and other terms and conditions related to the information provided to the PM service 102 during installation or use of the app. Once the consumer provides access to a particular feature of the mobile device, information derived from that feature may be provided to the PM service 102 to improve the quality of the consumer's interactions with the PM service and merchant devices.

For example, the consumer may indicate that they wish to provide motion data or location information to the app from location services circuitry included in their mobile device. Providing this information to the PM service 102 may enable the PM service 102 to provide consumer interfaces that are relevant to the particular location of the consumer device (e.g., by providing promotions or other information for merchants proximate to the consumer's current location). It should be appreciated that the various mobile device operating systems may provide the ability to regulate the information provided to the app associated with the PM service 102. For example, the consumer may decide at a later point to disable the ability of the app to access the location services circuitry, thus limiting the access of the consumer's location information to the PM service 102.

Various other types of information may also be provided in conjunction with an app executing on the consumer's mobile device. For example, if the mobile device includes a social networking feature, the consumer may enable the app to provide updates to the consumer's social network to notify friends of a particularly interesting promotion, or leverage social networking data to generate or update consumer information (e.g., one or more consumer profiles). It should be appreciated that the use of mobile technology and associated app may provide for particularly unique and beneficial uses of the PM service through leveraging the functionality offered by the various mobile operating systems.

Additionally or alternatively, the consumer device 108 may interact through the PM service 102 via a web browser. As yet another example, the consumer device 108 may include various hardware or firmware designed to interface with the PM service 102 (e.g., where the consumer device 108 is a purpose-built device offered for the primary purpose of communicating with the PA service 102, such as a store kiosk) via a network (e.g., the Internet).

The merchant devices 110A-110N may be computing devices that are associated with and/or operated by a merchant. For example, the merchant devices 110A-110N may include a merchant point-of-sale device, a tablet or other mobile device executing a mobile application and/or mobile browser application, a merchant e-commerce server, a merchant inventory system, or a computing device accessing a web site or app designed and configured to provide point-of-sale functionality (e.g., by accessing a PM service server 104 through an app or a web page via a browser using a set of merchant account credentials). Electronic data received by PM service 102 from the merchant devices 110A-110N may also be provided in various forms and via various methods. For example, the merchant devices 110A-110N may provide menu data or menu item data (e.g., items offered, ingredients, price, etc.), or real-time transaction data and/or inventory information as purchases are made from the merchant. In other embodiments, the merchant devices 110A-110N may be employed to provide information to the PM service 102 to enable the PM service 102 to generate promotions or other marketing information to be provided to consumer devices via network 112.

An example of a data flow for exchanging electronic information among one or more consumer devices, merchant devices, and the PM service is described below with respect to FIG. 3.

Example Apparatus[es] for Implementing Embodiments of the Present Invention

The server 104 may be embodied by one or more computing systems, such as apparatus 200 shown in FIG. 2. As illustrated in FIG. 2, the apparatus 200 may include a processor 202, a memory 204, input/output circuitry 206, communications circuitry 208, PM service circuitry 210, point-of-sale service circuitry 212, and data collection circuitry 214. The apparatus 200 may be configured to execute the operations described above with respect to FIG. 1 and below with respect to FIG. 6. Although these components 202-214 are described with respect to functional limitations, it should be understood that the particular implementations necessarily include the use of particular hardware. It should also be understood that certain of these components 202-214 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

As discussed in greater detail below, PM service circuitry 210 include hardware configured to generate and/or provide consumer interfaces to consumer devices. Point-of-sale service (POS) circuitry 212 may include hardware configured to provide point-of-sale interfaces to merchant devices. For example, a point-of-sale interface for a restaurant merchant may include a menu display including selectable menu items. In some embodiments, POS service circuitry 212 may be further configured to facilitate menu item preparation, such as by providing menu item data (e.g., indicating ingredients and/or amounts of the ingredients of a menu item) to a kitchen display. Data collection circuitry 214 may include hardware configured to collect electronic marketing information (e.g., motion data, discretionary data, clickstream data, transaction data, location data, real-time consumer device signals, etc.), which may be used by data collection circuitry 214 and/or PM service circuitry 210 to update the consumer interface of a consumer device and/or a merchant POS interface of a merchant device (e.g., as suitable for a particular consumer).

In some embodiments, circuitry 210-214 may utilize processing circuitry, such as the processor 202, to perform these actions. However, it should also be appreciated that, in some embodiments, one or more of circuitries 210-214 may include a separate processor, specially configured field programmable gate array (FPGA), or application specific interface circuit (ASIC). Circuitry 210-214 may therefore be implemented using hardware components of the apparatus configured by either hardware or software for implementing these programmatic functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Consumer device(s) 108 may be embodied by one or more computing systems, such as apparatus 400 shown in FIG. 4. The depicted apparatus 400 includes processor 402, memory 404, input/output circuitry 406, communications circuitry 408, and consumer interface circuitry 410. The apparatus 400 may be configured to execute the operations described herein with respect to FIGS. 1 and 6. The functioning of the processor 402, the memory 404, the input/output circuitry 406, and the communication circuitry 408 may be similar to the similarly named components described above with respect to FIG. 2. For the sake of brevity, additional description of these components is omitted.

Consumer interface circuitry 410 may include hardware configured to provide a consumer interface on device 400. In some embodiments, consumer interface circuitry 410 may communicate with PM service circuitry 210 of server 104 to provide the consumer interface. In some embodiments, consumer interface circuitry 410 may be configured to perform some or all of the techniques discussed herein with respect to PM service circuitry 210. For example, the consumer interface circuitry 410 may receive consumer device inputs and/or motion data and may process the consumer device inputs to programmatically manipulate the consumer display as discussed herein. In some embodiments, consumer interface circuitry 410 may be further configured to generate consumer device location data indicating the location of a consumer device and provide the consumer device location data to server 104 as an input to the PM service 102. For example, consumer interface circuitry 410 may use cell-tower triangulation, global positioning systems (GPS), internet protocol (IP) address, and/or any other suitable technique to determine the consumer device location data.

Merchant device(s) 110 may be embodied by one or more computing systems, such as apparatus 500 shown in FIG. 5. The depicted apparatus 500, which may be configured for use at a merchant location (e.g., a storefront, shop, restaurant, merchandise storage, warehouse, etc.), may include processor 502, memory 504, input/output circuitry 506, communications circuitry 508, and point-of-sale circuitry 510. The functioning of the processor 502, the memory 504, the input/output circuitry 506, and the communication circuitry 508 may be similar to the similarly named components described above with respect to FIG. 2. For the sake of brevity, additional description of these components is omitted.

Point-of-sale circuitry 510 may include hardware configured to provide the point-of-sale interface on the merchant device. In some embodiments, point-of-sale circuitry 510 may communicate with POS service circuitry 212 of server 104. In some embodiments, point-of-sale circuitry 510 may be configured to perform some or all of the techniques discussed herein with respect to POS service circuitry 212. In some embodiments, point-of-sale circuitry 510 may be configured to facilitate menu creation, inventory management, employee and enterprise management functionality (e.g., time keeping, payroll, etc.), menu item or inventory preparation, etc.

Example Service Data Flow

FIG. 3 depicts an example data flow 300 illustrating interactions between a server 302, one or more consumer devices 304, and one or more merchant devices 306. The server 302 may be implemented in the same or a similar fashion as the server 104 as described above with respect to FIG. 1, the one or more consumer devices 304 may be implemented in the same or a similar fashion as the consumer devices 108A-108N as described above with respect to FIG. 1, and the one or more merchant devices 306 may be implemented in the same or a similar fashion as the merchant devices 110A-110N as described above with respect to FIG. 1.

The data flow 300 illustrates how electronic information may be passed among various systems when employing a server 302 in accordance with some embodiments. The one or more consumer devices 304 and/or one or more merchant devices 306 may provide a variety of electronic marketing information to the server 302 for use in providing the consumer interface service to consumer devices. This electronic marketing information may include, but is not limited to, motion data, location data, clickstream data, transaction data, communication channel data, and/or discretionary data.

In some embodiments, server 302 may generate wallet identifying data or a digital consumer token associated with one or more consumer profiles and provide the digital consumer token to consumer device 304. When consumer device 304 shares the digital consumer token with merchant device 306, which merchant device 306 may pass the digital consumer token to server 304. In response, server 304 may return a point-of-sale interface configured to facilitate consumer interactions based on the consumer information associated with the consumer profile. In another example, server 304 may provide consumer profile information and/or business analytic data relevant to the consumer to merchant device 306 based on receiving the digital consumer token identifying the consumer account or profile(s). In that sense, the PM service may allow a consumer carrying consumer device 304 to enter within a proximity of a merchant shop and/or to enter a merchant shop (e.g., with consumer device 304 being configured to broadcast a digital consumer token) to receive personalized, customized or targeted service without requiring additional consumer interactions with consumer device 304, the merchant, or merchant device 306 that may interrupt, inconvenience or otherwise complicate the real-time consumer merchant interaction.

In some embodiments, as a result of transactions performed between the one or more consumer devices 304 and the server 302, the server 302 may provide fulfillment data to the consumer devices. The fulfillment data may include information indicating whether the transaction was successful, the location and time the product will be provided to the consumer, instruments for redeeming promotions purchased by the consumer, or the like.

In addition to the e-commerce interactions with the one or more consumer devices 304 offered by the server 302, the server 302 may leverage information provided by the consumer devices to improve the relevancy of the consumer interface provided to consumer device. For example, the server 302 may determine promotions, goods, and services that are more likely to be of interest to a particular consumer or group of consumers based on clickstream data, discretionary data, transaction data, location data, and other information provided by and/or relating to particular consumers. For example, the server 302 may detect the location of a consumer based on location data provided by the consumer device, and provide merchant information based on the proximity of the consumer to the merchants.

Alternatively, the server 302 may note that the consumer has an interest in a particular hobby (e.g., skiing) based on electronic marketing information associated with the consumer (e.g., profile information, discretionary data provided by the consumer, clickstream data such as a browser cookie that indicates they frequently visit websites that provide snowfall forecasts for particular ski resorts), prior transaction data, and offer promotions or items associated with that hobby (e.g., a promotion offering discounted ski equipment rentals or lift tickets). It should be appreciated that a variety of different types of electronic marketing information could be provided to the server 302 for the purpose of improving the relevancy of point-of-sale interfaces and/or consumer interfaces (e.g., including electronic marketing communications). It should also be appreciated that this electronic marketing information may be received from a variety of electronic sources, including various consumer devices, merchant devices, and other sources both internal and external to a PM service. For example, other data sources may include imported contact databases maintained by merchants, electronic survey questions answered by consumers, and/or various other forms of electronic data.

It should also be appreciated that the server 302 may also control other factors of the electronic marketing communications sent to the consumer other than the particular promotions included in the electronic marketing communication. For example, the server 302 may determine the form, structure, frequency, and type of the electronic marketing communication. As with the content of the electronic marketing communication, these factors may be programmatically determined according to various methods, factors, and processes based on electronic data received by the server 302 for the purpose of maximize the likelihood that the communication will be relevant to the recipient consumer.

The server 302 interactions with the one or more merchant devices 306 may be related to enabling the merchant to provide point-of-sale related services to consumers using the PM service. For example, the one or more merchant devices 306 may provide product data, menu item data, inventory data, and/or employee data to server 302. The sever 302 may receive this information and generate menu displays or point-of-sale interfaces that may be provided to merchant devices 306 Additionally or alternatively, consumer interfaces, map displays, merchant displays, and/or menu displays may be provided to consumer devices 304, such as for merchant browsing, online ordering, consumer self-service, etc.

In some embodiments, merchants may market their products using a PM service. For example, the one or more merchant devices 306 may provide promotion data defining one or more promotions to be offered by the PM service on behalf of the merchant. The server 302 may receive the promotion data and generate electronic marketing communications for providing such promotions via an e-commerce interface, making the promotions available for purchase by consumers. The server 302 may also receive product/inventory data about products from the one or more merchant devices 306. For example, a merchant may product/inventory data indicating particular products, product prices, inventory levels, and the like to be marketed via a PM service. The server 302 may receive this information and generate electronic marketing communications to offer the products to consumers. As discussed in greater detail herein, the electronic marketing communications may take the form of a consumer interface including ambient map displays of local merchants with indications of real-time merchant activity level, among other things.

The one or more merchant devices 306 may also receive information from the server 302. For example, in some embodiments a merchant may obtain access to certain consumer information and/or business analytic data aggregated, generated, or maintained by the server 302. As a particular example, a merchant's menu or point-of-sale interface may be customized based on the consumer information such as for ranking or ordering menu items within the point-of-sale interface, removing menu items including disfavored ingredients, etc.

Motion Data Based Consumer Interfaces

Some embodiments may provide consumer interfaces that are capable of interacting with motion data generated a consumer device. The motion data may be used, either by itself or in connection with other forms of electronic marketing information, to facilitate in the creation of electronic marketing communications that may be provided to the consumer interface. For example, a central system (e.g., including one or more networked servers such as system 102) and/or consumer device may be configured to provide the consumer interface to a consumer device. The consumer interface may include a game interface or otherwise indicate a motion data object to be completed via the creation of motion data on the consumer device. Based on the motion data provided by the consumer, the system may determine one or more promotion parameters of a promotion and provide an electronic marketing communication of the promotion to the consumer device via the consumer interface.

FIG. 6 shows a flowchart of an example of a method 600 of determining promotion data parameters based on motion data performed in accordance with some embodiments. Method 600 is described as being performed by components of computing system 100. For example, some or all of the steps of method 600 may be performed by one or more servers 104 and/or a consumer device 108 of system 100. In some embodiments, method 600 may be performed by one or more other suitably configured servers, apparatuses, storage devices, routers, network switches, etc. Furthermore, it is appreciated that one or more of the steps discussed herein as being performed by servers 104 may be performed by a consumer device 108.

Method 600 may begin at 602 and proceed to 604, where one or more servers 104 may be configured to connect with merchant devices and consumer devices via a network. For example, communications circuitry 208 of one or more servers 104 may be configured to connect with merchant devices 110A-N and consumer devices 108A-N via network 112 (e.g., the Internet). Merchant devices 110A-N may be associated with one or more different merchants. In some embodiments, the connection between the one or more servers 104 and a consumer device 108 may include a wireless connection, such as a mobile broadband or other wireless Internet connection. Here, the consumer device may be capable of maintaining (e.g., at least intermittently) the connection with the one or more servers as the consumer is carrying the consumer device.

The merchant devices may be associated with a plurality of different merchants and/or merchant locations. For example, each of merchant devices 110A-N may be physically located at a particular merchant device location such as a merchant's storefront, shop, restaurant, warehouse, etc. Server 104 may receive merchant location data from a merchant device 110, and may be configured to determine the merchant device location based on the merchant location data received from merchant device 110. The merchant location data may be determined using any suitable technique including cell-tower triangulation, global positioning systems (GPS), internet protocol (IP) address, or merchant device data input (e.g., in a registration or configuration process for the merchant device).

In some embodiments, server 104 may connect with merchant devices associated with multiple different merchants. As such, server 104 and or PM service 102 may serve as a central system that provides interoperability between merchant devices and consumer devices. Furthermore, server 104 and or PM service may act as an aggregator and processor of merchant and/or consumer data, and may leverage such data to provide "big data" analytics to smaller merchants that would otherwise be unable to procure or leverage such data.

In some embodiments, the associations between merchant devices and merchant device locations may be stored in a merchant database, such as database 106 of PM service 102. For example, each merchant device may be associated with a merchant device identifier that uniquely identifies the merchant device. Furthermore, each merchant device may be associated with a merchant identifier that uniquely identifies the merchant, and the merchant location data that indicates the location of the merchant device. In some embodiments, a single merchant or merchant location may be associated with multiple merchant devices. For example, a restaurant merchant may provide merchant devices to each member of the wait staff to facilitate point-of-sale functionality such as taking orders, creating tabs, facilitating payments, etc.

At 606, the one or more servers 106 may be configured to associate a consumer device with a consumer account. For example, the consumer device may be associated with a consumer account record of a consumer database, such as database 106 of PM service 102. In some embodiments, the consumer device may be associated with the consumer account record based on server 106 receiving login data (e.g., username, password, biometric identifier, etc.) associated with the consumer account record from the consumer device via the network. The login data may be generated by the consumer device via a consumer device input (e.g., to a touchscreen, touch pad, keyboard, mouse, fingerprint reader, etc.), or in another example, may be stored within a memory of the consumer device and provided to server 106 without requiring the consumer device inputs.

At 608, the one or more servers 106 may be configured to generate a consumer interface including a representation of an object that is responsive to motion data. As discussed above, the consumer interface may be provided to or otherwise executed on the consumer device. For example, the representation of the object may be a graphical representation provided to a display of the consumer device. The object can take on various forms, and can be manipulated by motion data and/or other consumer device input in various ways. For example, the location of the object with the consumer device display may be changed based on motion data indicating tilting, rotation, or spatial movement of the consumer device as measured by a motion sensor (e.g., a six-axis gyroscope accelerometer) representation of the object may be provided to the display of the consumer device. In another example, the size, visual appearance, prominence, color, and/or other characteristic of the object may be changed responsive to the motion data. As discussed in greater detail below, the object may in some embodiments be represented within a game, and may respond to the motion data based on one or more motion data objectives associated with the game. Advantageously, the use of motion data for interactions with the consumer interface leverages the "mobile" aspect of mobile consumer devices, and provides for enhanced interface control that would otherwise not be available on or suitable for stationary devices. Furthermore, the representation of the object responsive to motion data can be altered in response to changes in the motion data to provide the user with a real-time visual feedback for the motion data.

At 610, the one or more servers 106 may be configured to provide the consumer interface to the consumer device via the network. For example, server 104 may provide the consumer interface to consumer device 108 via network 112. FIGS. 7-11 respectively show example consumer interfaces 700-1100 in accordance with some embodiments. Each of consumer interfaces 700-1100 are configured to provide examples of network-based games that may be provided to a consumer interface. Consumer interface 700 includes a lever tilting game, consumer interface 800 includes a finders keepers game, consumer interface 900 includes a selection game, consumer interface 1000 includes a question and answer game, and consumer interface 1100 includes a scavenger hunt game.

At 612, the one or more servers 104 may be configured to determine a motion data objective. A "motion data objective," as used herein, refers to an objective or goal that can be achieved based on motion data interaction with the consumer interface. In that sense, each of the games shown in consumer interfaces 700-1100 may be associated with different motion data objectives. In some embodiments, the one or more servers 104 may be configured to determine a particular game or motion data objective. For example, the game may be determined based on consumer device selection. In another example, the one or more servers 104 may be configured to programmatically determine the game, such as based on consumer data indicating consumer preference for a particular game (e.g., via tracking consumer activity) or based on a predetermined promotion or promotion data parameter. For example, where a promotion is associated with a particular game, the particular game may be selected in response to determining to provide an electronic marketing communication of the promotion.

Figure 7:
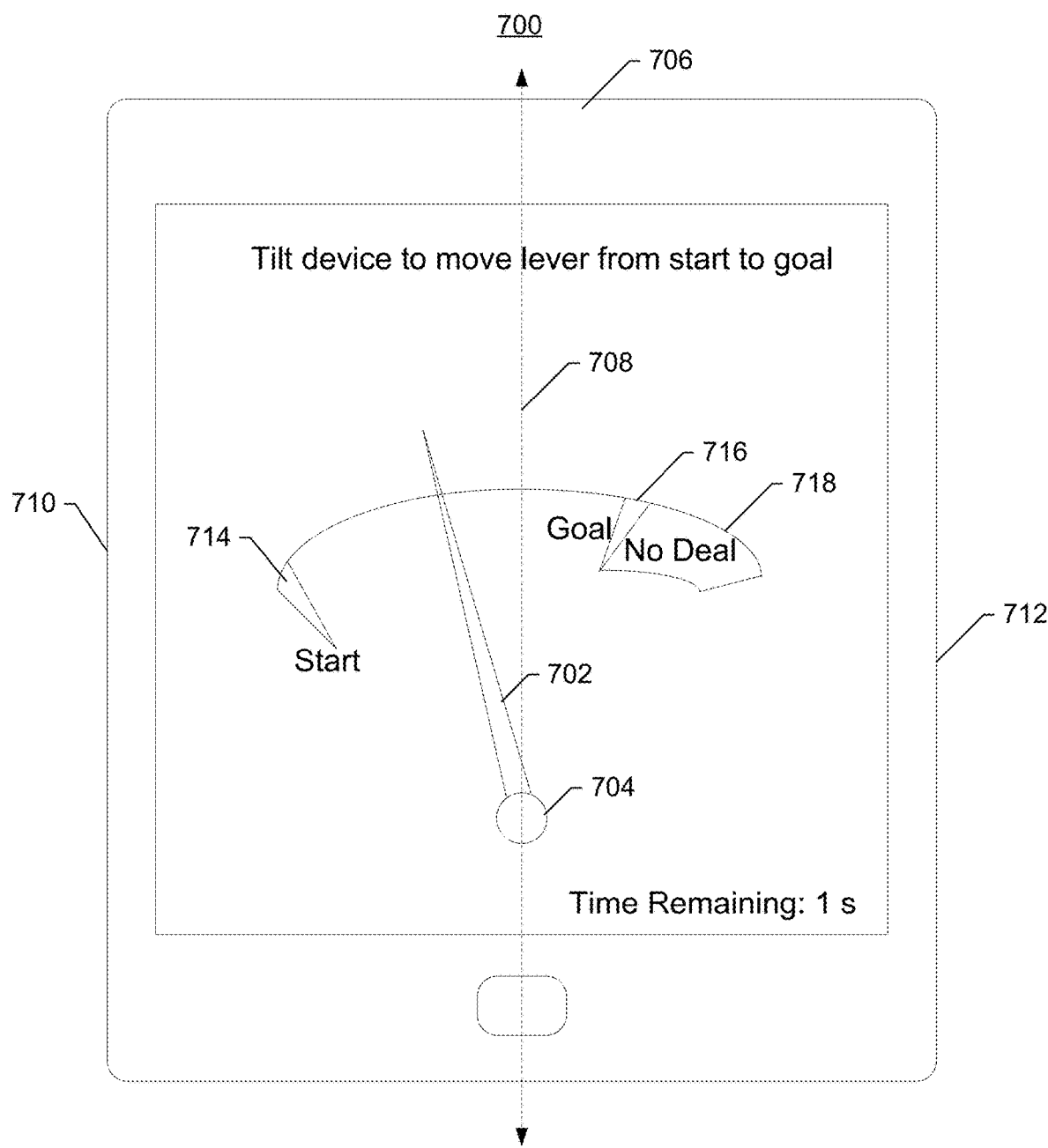

With reference to FIG. 7, consumer interface 700 may include a lever tilting game with a representation of a lever object 702 (or "lever 702"). The lever 702 is an example of a virtual representation of an object that is responsive to motion data. For example, lever 702 can be tilted (e.g., left or right) along a dial based on the consumer tilting consumer device 706 along Y axis 708. In some embodiments, the tilting may be determined by the sensing a rotational degree of freedom by a six-axis gyroscope accelerometer and/or a three axis gyroscope. Here, lever 702 may be rotated left via bolt 704 when left side 710 of consumer device 706 is tilted down and right side 712 of consumer device 706 is tilted up along Y axis 708. Lever 702 may be rotated right via bolt 704 when right side 712 of consumer device 706 is titled up and left side 710 is tilted down along Y axis 708. Lever 702 may be animated to move in a manner that would be intuitive to a user based on the effects of gravity when the consumer device is tilted, as indicated by the motion data.

Consumer interface 700 may further indicate the motion data objective associated with the lever tilting game. For example, a message indicates that the consumer should tilt the consumer device to move the lever from start 714 to goal 716. Furthermore, a second message indicates that the consumer has a limited time. Here, the motion data objective may include moving lever 702 as close as possible to goal 716 within a predetermined time (e.g., 1 second, 2 seconds, etc.). Alternatively or additionally, the motion data objective may include moving lever 702 within the space of goal 716. Here, the area of the dial represented by goal 716 may act as a motion data threshold for satisfying the motion data objective, where the motion data objective is satisfied only when lever 702 is within a range of predetermined locations, such as the distance along the dial defined by goal 716. In some embodiments, the lever tilting game may further include a no deal region 718, where the motion data objective includes moving the lever as close to goal 716 as possible without reaching the no deal region 718. As discussed in greater detail below, promotion data parameters such as the amount of a discount may be determined based on game performance. For example, an increasingly greater discount may be provided based on lever 702 being closer to goal 716, while no discount may be provided if lever 702 goes past goal 716 and into no deal region 718.

Figure 8:
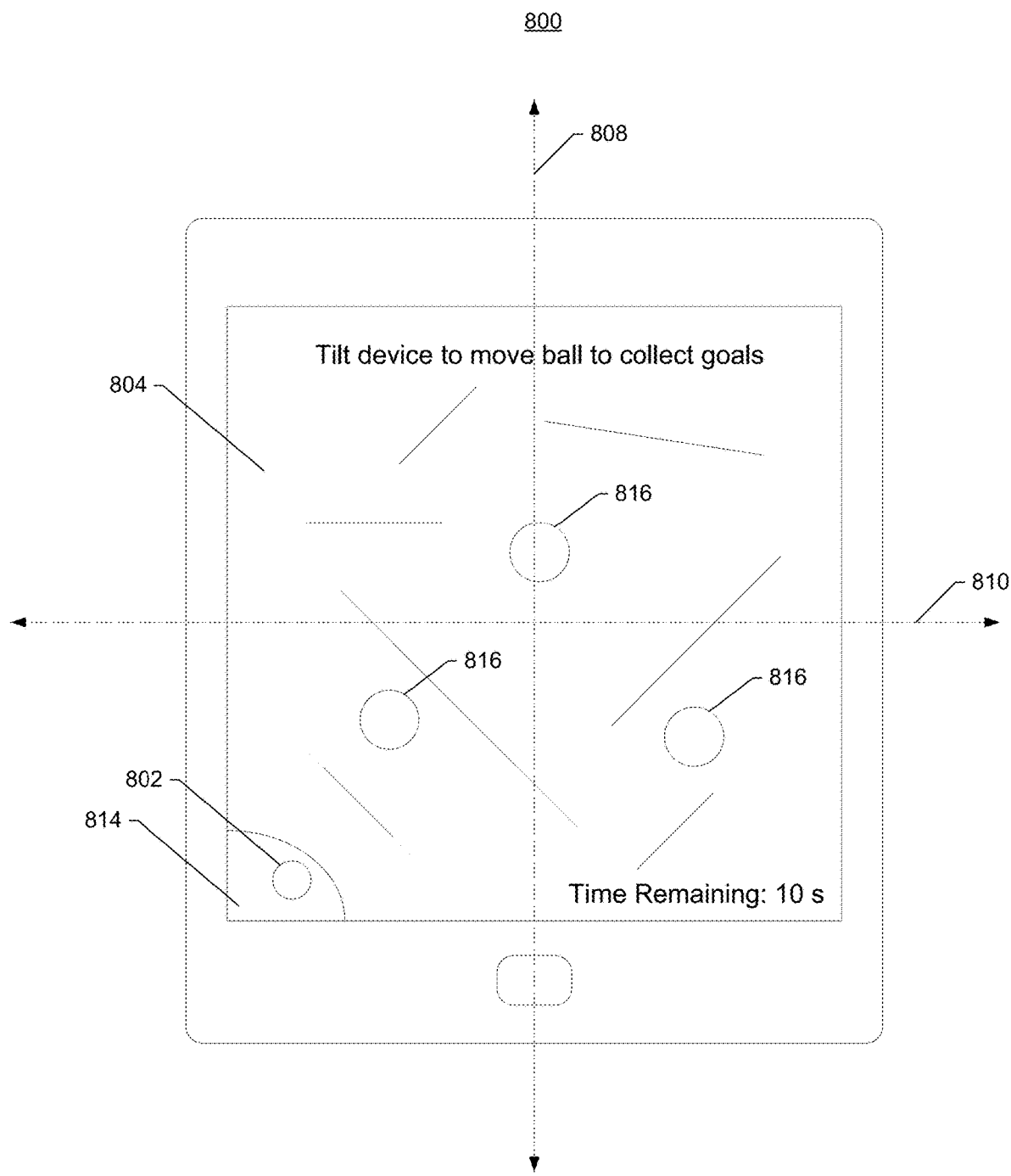

With reference to FIG. 8, consumer interface 800 may include a finders keepers game with a representation of an avatar object 802 (or "avatar 802"). The avatar 802 is another example of a virtual representation of an object that is responsive to motion data. For example, avatar 802 may be a ball that is "rolled" along virtual surface 804 based tilting of the consumer device 806 along rotational axes of a motion sensor. In another example, the avatar may be a virtual person, animal, or other object that moves along the virtual surface 804 based on the tilting. In some embodiments, the tilting may be determined by the sensing of two (e.g., Y axis 808 and X axis 810) or more (e.g., Y axis 808, X axis 810, and a Z axis) rotational degrees of freedom by a six-axis gyroscope accelerometer and/or a three axis gyroscope. Avatar 802 may be animated to move in a manner that would be intuitive to a user based on the effects of gravity when the consumer device is tilted, as indicated by the motion data.

Consumer interface 800 may further indicate the motion data objective associated with the finders keepers game. For example, a message indicates that the consumer should tilt the consumer device to move the avatar 802 from start 814 to collect goal 816. Furthermore, a second message indicates that the consumer has a limited time (e.g., 10 seconds) Here, the motion data objective may include moving avatar 802 to or near as many goals 816 as possible within a predetermined time (e.g., 5 second, 10 seconds, etc.). The finders keepers game may be include with multiple levels. Each level may be associated with a higher level of difficulty in the form of more goals and/or less time, and may further be associated with more favorable promotion data parameters. For example, a first level may require the collection of three goals to unlock a first promotion. A second level may require the collection of four goals to unlock a second more valuable promotion, etc.

Figure 9:
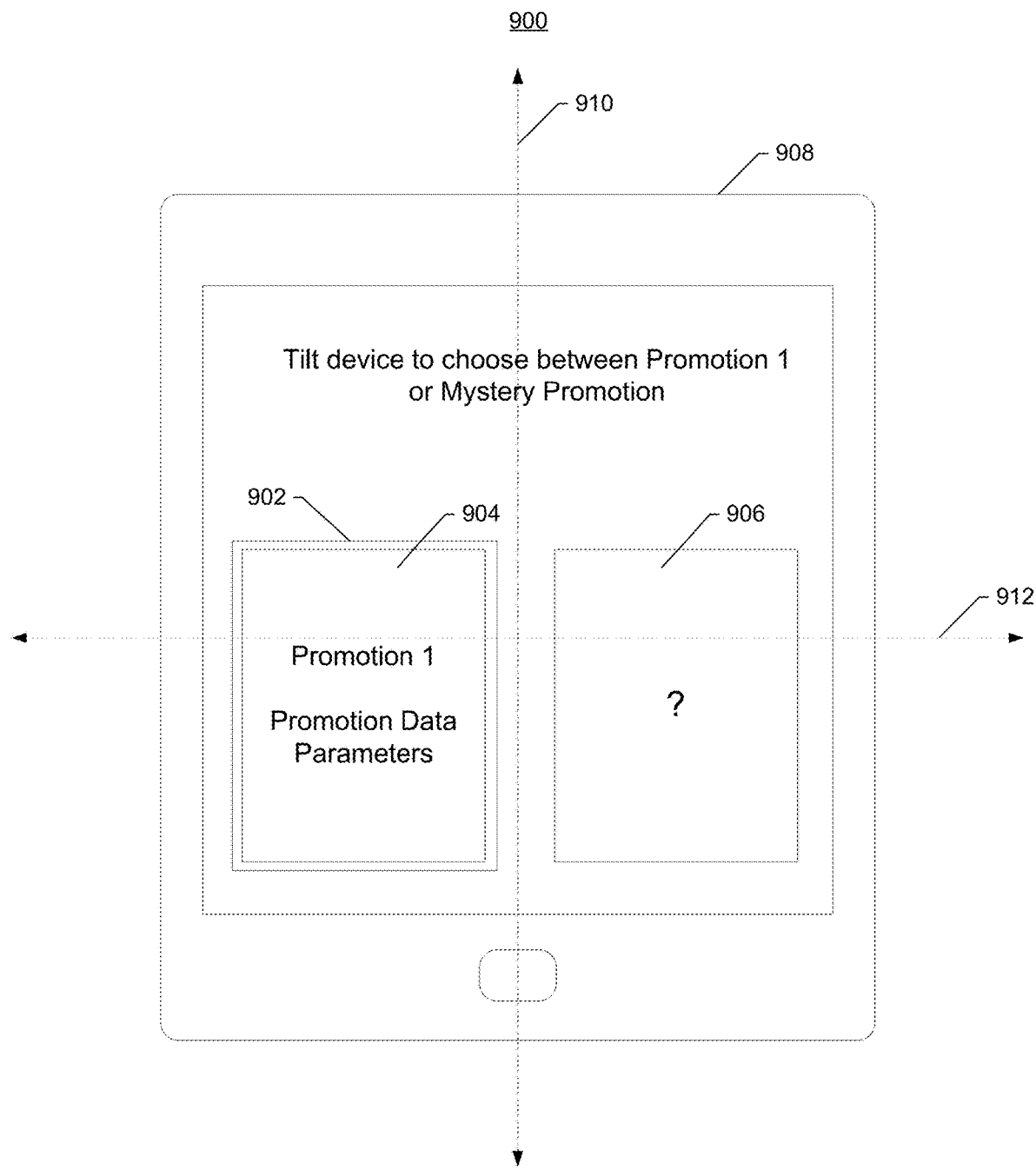

With reference to FIG. 9, consumer interface 900 may include a selection game with a representation of a selector object 902 (or "selector 902"). Selector 902 is another example of a virtual representation of an object that is responsive to motion data. For example, selector 902 may be moved from left to right between selection option 904 and selection option 906 based on rotation of consumer device 908 along Y axis 910. The position of selector 902 may be determined by the sensing of a rotational degree of freedom by a six-axis gyroscope accelerometer and/or a three axis gyroscope. Alternatively or additionally, selector 902 may be moved from left to right between selection options 904 and 906 based on directional movement along X axis 912. Here, the position of selector 902 may be determined by the sensing of a directional degree of freedom by a six-axis gyroscope accelerometer and/or a three axis accelerometer. As such, selector 902 may be animated to move in a manner that would be intuitive to a user based the corresponding direction that the consumer device is tilted or moved, as indicated by the motion data.

Consumer interface 900 may further indicate the motion data objective associated with the selection game. For example, a message indicates that the consumer should tilt the consumer device to select between a displayed promotion at selection option 904 or a hidden (e.g., mystery) promotion 906. Here, the motion data objective may include moving selector 902 to one of the selection options 904 or 906. In some embodiments, the consumer interface may be further configured to receive a second consumer input or motion data input to confirm a selection of a selection option 904 or 906. The second input may be any suitable input, including touchscreen input, voice input, and/or a second motion data input. For example, the consumer may tilt the consumer device to the right side two times to select and confirm selection of the mystery promotion, or to the left side two times to select and confirm selection of the displayed promotion.

In some embodiments, a selection game may include an element of chance. For example, selection of the mystery option may result in a promotion with less favorable promotion data parameters (e.g., less valuable item, less favorable discount, etc.) or may result in loss of the opportunity for promotion 1 (and/or other discount).

Figure 10:
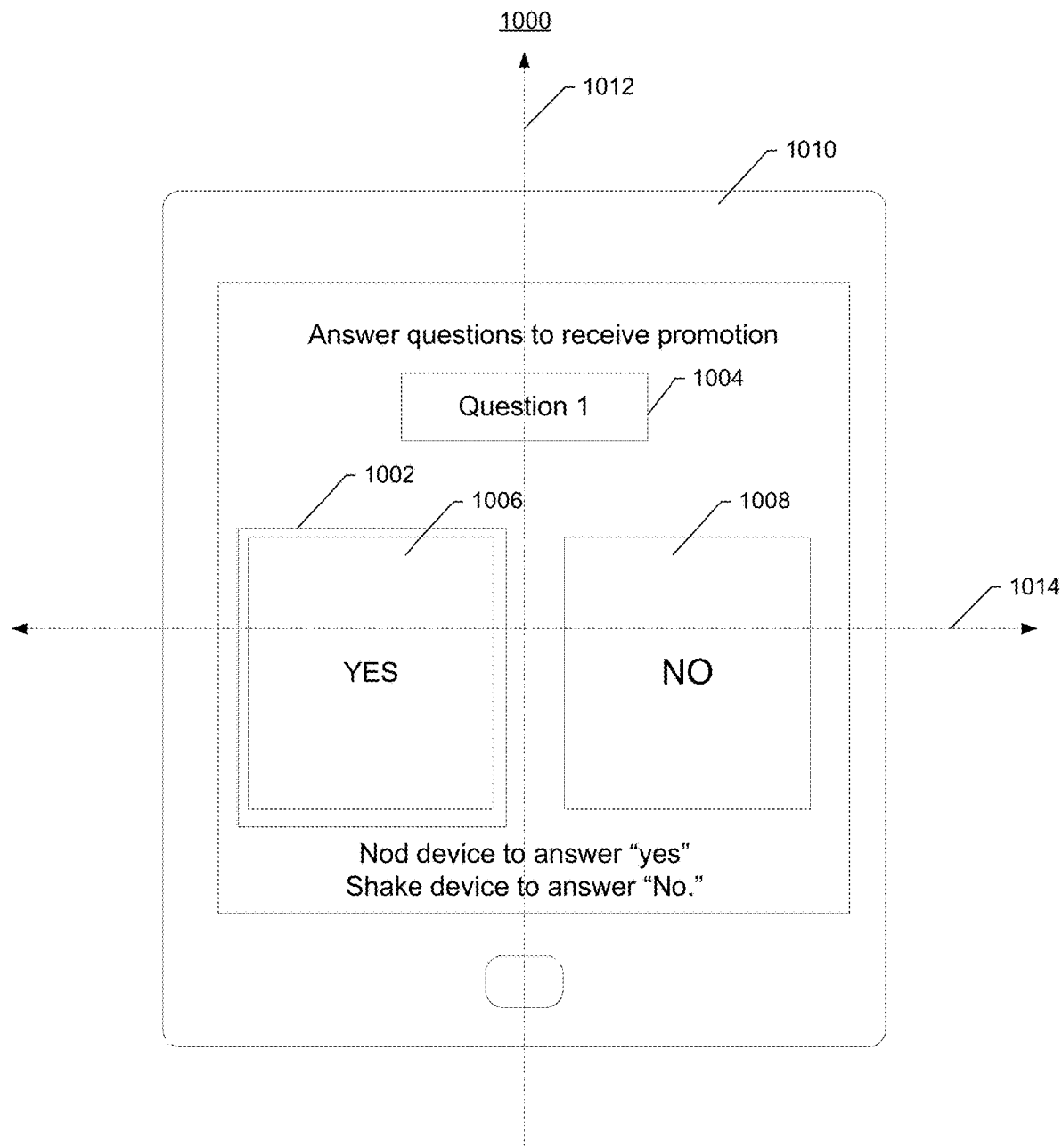

With reference to FIG. 10, consumer interface 1000 may include a question and answer game with a representation of a selector object 1002 (or "selector 1002"). Selector 1002 is another example of a virtual representation of an object that is responsive to motion data. In some embodiments and similar to selector 902 discussed above, selector 1002 may be moved from left to right between selection option 1006 and selection option 1008 based on rotational and/or directional movement of the consumer device. Here, selection option 1006 represents a yes answer to question 1004 and selection option 1008 represents a no answer to question 1004. However, consumer interfaces 900, 1000, or the like, may also be used to provide for other types of questions, including multiple choice questions with two or more associated selection options that may be selected based on motion data.

In some embodiments, where question 1004 is a yes or no question, selector 1002 may be moved between the yes and no selection options 1006 and 1008 based on intuitive horizontal (e.g., side to side head movement indicating "no") or vertical (e.g., up and down head movement indicating "yes") movement and/or rotation of the consumer device. For example, the consumer device may be configured to utilize a three axis accelerometer to measure directional motion of consumer device 1010 along Y axis 1012, which may be associated with the yes selection option 1006, or along X axis 1014, which may be associated with the no selection option 1008. Alternatively or additionally, the consumer device may be configured to utilize a three axis gyroscope to measure rotational motion of consumer device 1010 along Y axis 1012, which may be associated with the no selection option 1008, or along Y axis 1014, which may be associated with the yes selection option 1008. In some embodiments, to provide flexibility between rotational and directional commands, the consumer device may be configured to utilize a six-axis gyroscope accelerometer, or a three access accelerometer in connection with a separate three axis gyroscope. As such, selector 1002 may be animated to move between the "yes" and "no" selection options in a manner that would be intuitive to a user based the corresponding direction that the consumer device is tilted and/or moved, as indicated by the motion data.

Consumer interface 1000 may further indicate the motion data objective associated with the question and answer game. For example, a message indicates that the consumer can nod or shake the consumer device to provide an answer to question 1004, and that providing an answer to question 1004 via the motion data completes the motion data objective. As such, the motion data objective may include moving selector 1002 to one of the selection options 1006 or 1008. In some embodiments, the consumer interface may be further configured to receive a second consumer input or motion data input to confirm a selection of a selection option 1006 or 1008. The second input may be any suitable input, including touchscreen input, voice input, and/or a second motion data input.

Advantageously, via the selection game and/or a question and answer game, consumer selections may be used to determine consumer account data by discovering consumer preferences. Such preferences may then be used for relevance determination in matching promotions to consumers and providing efficient electronic marketing communications. For example, information that is determined to be relevant to the consumer may be processed and sent via a network, while information that is not relevant may not be sent. As such, the efficiency of the processing, memory, power, and network components of the system is increased, including increased throughput of relevant data per unit time and/or computing cost.

Furthermore, the selection game and/or a question and answer game can be configured to inform consumer decision with respect to location-based activity and local deal awareness by presenting promotions associated with local merchants and/or questions that are relevant to local merchants and/or local merchant promotions.

Figure 11:
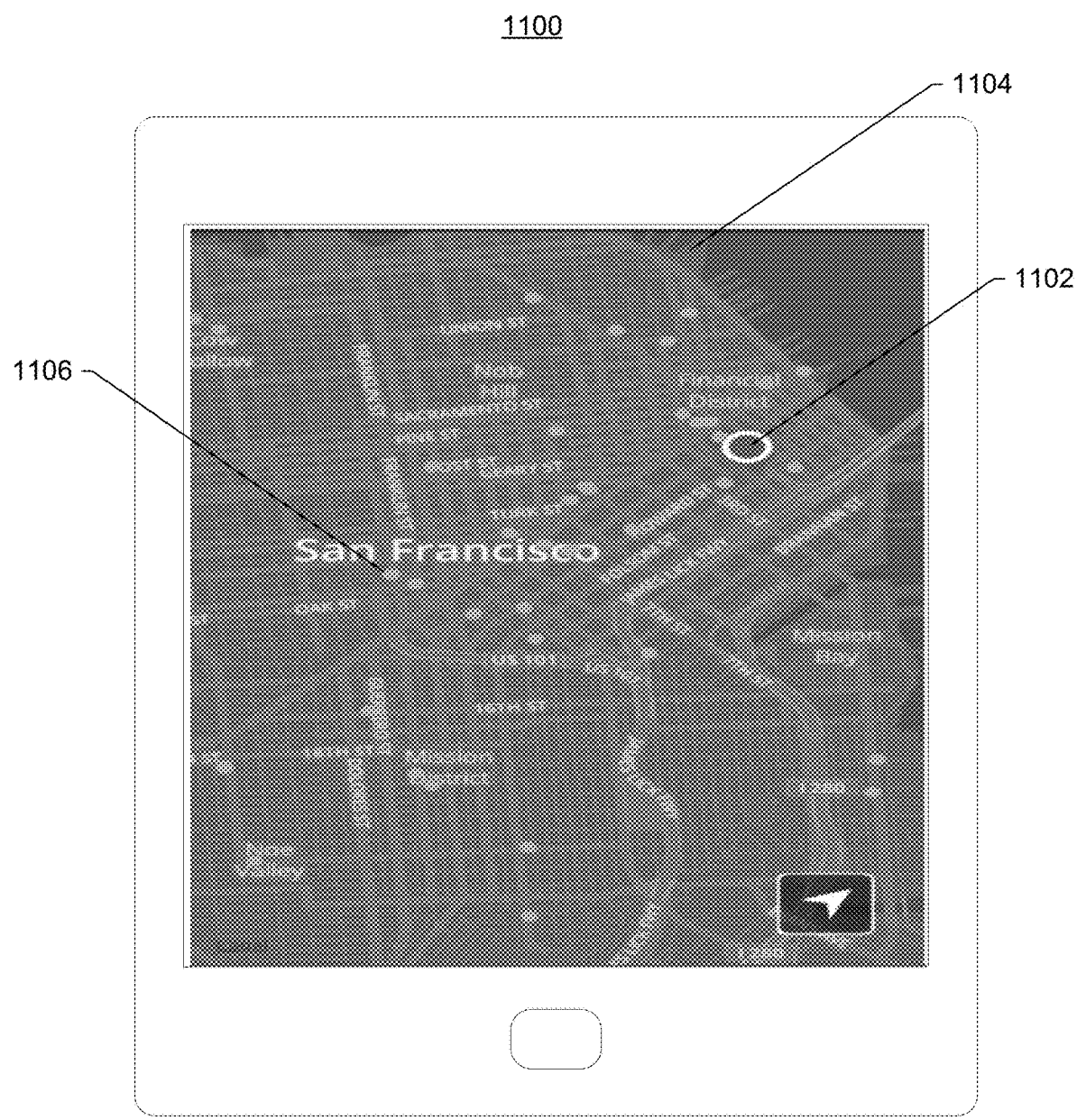

With reference to FIG. 11, consumer interface 1100 may include a scavenger hunt game with a representation of a consumer device location object 1102 (or "location object 902"). Location object 1102 is another example of a virtual representation of an object that is responsive to motion data. For example, location object 1102 may be located within map display 1104 based on the location of the consumer device, and may be moved within map display 1104 based on motion data indicating movement of the consumer device. The one or more servers 104 may be configured to determine the location of the consumer data based on receiving location data via network 112. The location data may be determined based on any suitable technique including cell-tower triangulation, global positioning systems (GPS), internet protocol (IP) address, communication beacons, WiFi access point identification, near field communication, etc. In some embodiments, the location data may be programmatically determined based on motion data from a motion sensor. For example, the consumer device may include a six-axis gyroscope accelerometer and/or a three axis accelerometer configured to generate motion data over time and process the motion data to update a consumer device location. In some embodiments, known location data (e.g., determined based on triangulation, GPS, etc.) may be used to determine an initial location while motion data may be used to determine subsequent location data. Advantageously, the consumer device does not require an active connection to the network 112 and/or the PM service 102 to update the consumer interface 1100 based on motion data generated by the consumer device. In some embodiments, the motion data and/or determined location data based on the motion data may be stored on the consumer device, and transferred to the PM service 102 when connectivity becomes available. As such, embodiments may provide technical solutions to the Internet-centric challenge of remote location tracking of mobile devices that may have limited or intermittent Internet connectivity (e.g., using mobile broadband/location services) while traversing various locations (e.g., cell-tower dead spots, metallic buildings, basements, other areas of low connectivity). Accordingly, the position of location object 1102 within map display 1104 may be updated based on the updated consumer device locations.

Consumer interface 1100 may further indicate the motion data objective associated with the scavenger hunt game. For example, a message may indicate that the consumer should find a goal, such as a particular object, location, merchant shop, destination, landmark, etc. within a city or other geographical area. Here, the motion data objective may include registering the consumer device location as being at or within a goal location, such as by the consumer carrying the consumer device to the goal. In some embodiments, one or more goal locations may be indicated within consumer interface 1100, such as goal location 1106. The displayed goal location may assist the consumer in traveling to the actual associated location. In another example, a goal location may be indicated via a name, a clue, or other identifying data, but may not be shown within map display 1104 to provide a scavenger hunting challenge. The consumer may be provided a predetermined amount of time to reach a particular location, or a series or group of locations.

In some embodiments, promotions associated with local merchants that are within a predetermined distance to the consumer device location may be integrated within the scavenger hunt game. Furthermore, the consumer device locations may be tracked for relevance and consumer status determinations.

At 614, the one or more servers 104 may be configured to receive motion data from the consumer device via the network. In some embodiments, the motion data may be received from the consumer device while a consumer interface (e.g., a consumer interface 700-1100) is provided or otherwise executed on the consumer device. In some embodiments, the consumer device may be a thin client device configured to receive the consumer interface via a consumer interface service provided by the one or more servers 104 via the Internet. Here, the consumer device may perform minimal processing, receive and display video data associated with the consumer interface, and generate and provide the motion data (and/or location data) to the one or more servers 104. In another example, some or all of the functionality discussed herein for the one or more servers 104 may be performed by processing circuitry of the consumer device. For example, the consumer device may generate the consumer interface and update the consumer interface based on motion data.

At 616, the consumer device may be configured to determine a motion data score threshold for a motion data score. A "motion data score," as used herein, refers to an indication of an amount or level of completion toward the motion data objective. In some embodiments, the motion data objective may be associated with a "motion data score threshold" that must be satisfied by the motion data score in order for the motion data objective to be successfully completed. As discussed above, a motion data score threshold may vary depending on the nature of the motion objective. In the example of the lever tilting game shown in FIG. 7, the motion data score threshold may define how close lever 702 must be relative to goal 716 in order for the motion data objective to be satisfied, and/or may define the no deal region 718 within which the motion data score threshold is not satisfied. In the example of the finders keepers game shown in FIG. 8, the motion data score threshold may define how many goals 816 must be collected in order for the motion data objective to be satisfied. In the example of a selection game or a question and answering game as shown in FIGS. 9 and 10 respectively, the motion data score threshold may be defined as the requirement that the consumer provide motion data to generate an answer to the question (or multiple questions), where the motion data objective is satisfied when an answer has been provided. In some embodiments, such as where the motion data objective is associated non-binary outcomes (e.g., collect a predetermined number of goals 816 within a predetermined time, bring lever 702 as close to goal 716, etc.), the determination of a motion data score threshold may be omitted.

At 618, the one or more servers may be configured to determine a motion data score based on the motion data received at 614. As discussed above, the motion data scores may define an amount or level of completion by the motion data toward the motion data objective.

With reference to the lever tilting game of FIG. 7, a motion data score may be determined based on the distance of lever 702 to goal 716 when the predetermined amount of time for moving lever 702 has lapsed. The motion data score may further reflect whether lever 702 has entered no deal region 718, where the motion data may be assigned a low motion data score indicating failure of the motion data objective. With reference to the finders keepers game of FIG. 8, a motion data score may be determined based on the number of collected goals 816 when the predetermined amount of time for moving avatar 802 has lapsed. Furthermore, additional criteria associated with the finders keepers may also be reflected by the motion data score, such as successful avoidance of obstacles on surface 804. With reference the selection game and question and answer games of FIGS. 9 and 10 respectively, a motion data score may be determined based on whether or not the consumer has provided a selection or answer, or multiple selections or answers (e.g., a survey, three questions game, etc.). With reference to the scavenger hunt of FIG. 11, a motion data score may be determined based on the distance of location object 1102 (e.g., and thus the consumer device) to a goal location, or multiple goal locations (e.g., find three items within a predetermined amount of time, as soon as possible (e.g., before other players in multi-player embodiments)).

At 620, the one or more servers 104 may be configured to determine whether the motion data score satisfies the motion data score threshold. As discussed above, when the motion data score satisfies the motion data score threshold the motion data objective may be determined as being satisfied or completed. In some embodiments, a motion data score threshold is not used. Here, server 104 may otherwise determine that the motion data objective has been satisfied and/or completed by the motion data received from the consumer device.

In response to determining that the motion data score fails to satisfy the motion data score threshold, method 600 may return to 612, where the one or more servers 104 may be configured to determine a (e.g., second) motion data objective. Here, the consumer interface may be provided with another instance of the first game, or a different game. In another example, the consumer device may be locked out from successfully completing the motion data objective subsequent to a failed attempt, such as permanently or for a period of time (e.g., play once a day, two tries a day, once a week, etc.). For example, where successful completion of a motion data objective is associated with access to a promotion or reward, or a favorable promotion parameter (e.g., larger discount, upgraded item, name brand merchant, etc.), the opportunities for successfully completing the motion data objective may be limited to avoid trivializing completion of the motion data objective. In another example, the consumer interface may be configured to provide additional opportunities or an unlimited number of opportunities until the motion data objective has been satisfied to encourage consumer participation.

In response to determining that the motion data score satisfies the motion data score threshold, method 600 may proceed to 622, where the one or more servers 104 may be configured to determine one or more promotion data parameters of a promotion based on the motion data score. In addition to the motion data score, the one or more motion data parameters may be determined based on the consumer account data associated with the consumer device discussed above at 606. Some example promotion data parameters may include the underlying item (e.g., the product and/or service of the promotion), the accepted value (e.g., the cost paid by the consumer to purchase the promotion), and/or the promotional value (e.g., the retail non-promotional price of the underlying product or service).

In some embodiments, the item promotion parameter may be determined based on the motion data score and/or motion data. With respect to the selection game shown in FIG. 9, for example, motion data indicating that the consumer has selected promotion 1 including predefined promotion data parameters may result in the selection of the promotion data parameters associated with promotion 1. Alternatively, the selection of the mystery promotion may result in the determination of a different item.

With respect to the question and answer game shown in FIG. 10, for example, motion data indicating consumer answers to the provided questions may be used as electronic marketing data to determine consumer interests, preferences, behaviors, etc. Such electronic marketing data may be associated with the consumer account data, and may be used to determine the underlying product and/or service based on relevance to the consumer.

In some embodiments, the item promotion parameter may be determined independent of motion data. For example, the lever tilting game shown in FIG. 7 and the finders keepers game shown in FIG. 8 may be associated with a "deal of the day," or the like, where successful completion of the associated motion data objectives results in access to the predetermined item. In that sense, determination of one or more promotion parameters of the promotion may be performed prior to receiving any motion data, such as at 608 in connection with providing the consumer interface to the consumer device. In some embodiments, a consumer interface 700-1100, or the like, may further include an impression, electronic display, or other indication of the promotion and/or the promotion data parameters (e.g., as shown in FIG. 9).

In addition or alternative to the underlying item, the value of the discount associated with the promotion may be determined based on the motion data score. For example, a greater discount in the form of a lower accepted value and/or a higher promotional value may be determined based on the motion data scores satisfying the motion data score threshold. In another example, the level of the discount may be determined based on the amount or level of completion of a motion data score threshold. For example, a higher level of completion may be associated with a lower accepted value and/or a higher promotional value for the promotion. In some embodiments, the promotion parameters may be predetermined and successful completion of the motion data objective may result in access to the promotion including the predetermined promotion data parameters.

The one or more promotion parameters may further be determined based on consumer account data. For example, the consumer account data may accessed from a consumer database, such as database 106 of the PM service 102. As discussed above at 606, the consumer device may be associated with a particular consumer account. Furthermore, electronic marketing information received from consumer device and/or merchant devices that indicate the consumers interests, location, preferences, group membership, age, gender, etc. may also be included or associated with the consumer account data. As such, the one or more servers 104 may be configured to programmatically determine promotions and/or promotion parameters that are relevant to the consumer's interests, location, preferences, group membership, age, gender, etc. based on the consumer account data. In some embodiments, such as where promotion parameters are determined independent of motion data, the promotion parameters may be determined based on relevance to consumer account data.

At 624, the one or more servers 104 may be configured to generate an electronic marketing communication of the promotion. At 626, the one or more servers 104 may be configured to provide the electronic marketing communication to the consumer device. The electronic marketing communication may include a display of the promotion and/or the promotion parameters, and may be configured to be provided through various communication channels such as email, mobile application, web browser application, text, etc. In some embodiments, the electronic marketing communication may be provided to the consumer interface, such as a results display subsequent to the completion of a game via a display shown in FIGS. 7-11. The electronic marketing communication may further provide for the purchase or acceptance of the promotion, such as via a buy button in the consumer interface.

In some embodiments, the one or more servers 104 may be configured to provide for multi-player functionality. For example, consumer devices and consumer accounts associated with different consumers may be connected with each other via network 112. Here, a consumer interface may include representations of two or more objects, where each object is responsive to motion data generated by a different consumer device via respective consumer interfaces. A multi-player game may include a competitive (e.g., highest motion data score) and/or cooperative element (e.g., aggregate motion data score), which further provide social incentives to invite new users or return access of the electronic marketing communications. The consumer interface may further provide for leaderboard point tracking, player rankings, etc. Furthermore, the consumer interface may provide for the referrals of other consumers that may be associated with the consumer account data.

In some embodiments, the one or more servers may be configured to provide motion data score tracking for consumer accounts. For example, consumers may be allowed to collect points over time to unlock special "surprise" deals, exclusive deals, or the like. Such deals may include promotion data parameters that are more beneficial (e.g., higher quality item, higher discounts) than promotion deal parameters unassociated with unlocked deals. Method 600 may then proceed to 628 and end.

CONCLUSION

Many modifications and other embodiments will come to mind to one skilled in the art to which these embodiments pertain having the benefit of the teachings presented in the foregoing descriptions and the associated drawings. Therefore, it is to be understood that embodiments and implementations are not to be limited to the specific example embodiments disclosed and that modifications and other embodiments are intended to be included within the scope of the appended claims. Although specific terms are employed herein, they are used in a generic and descriptive sense only and not for purposes of limitation.

That which is claimed:

1. A system, comprising:
   one or more servers including:
      communication circuitry configured to connect with a consumer device via a network, the consumer device including a motion sensor including one or more of:
         a six-axis gyroscope accelerometer; or
         a three axis gyroscope; and
      processing circuitry configured to:
         generate a consumer interface, the consumer interface configured to display an object on a virtual surface of the consumer interface at a start location of the consumer interface, a change in a location of the object being responsive to motion data;
         provide the consumer interface to the consumer device via the network;
         determine a motion data objective, the motion data objective being a new location to which the object can be moved to by generation of motion data,
         wherein the motion data indicates a rotational motion of the consumer device, and wherein the object that is responsive to the motion data generated by the motion sensor moves within the consumer interface based on the rotational motion of the consumer device;

receive the motion data from the consumer device via the network, the motion data generated by a motion sensor of the consumer device while the consumer interface is being provided to the consumer device and while the consumer interface is being displayed on the consumer device;

provide, in real-time, visual feedback to the consumer device, the visual feedback responsive to the motion data, the visual feedback provided via the consumer interface, the providing of the visual feedback causing the consumer interface to display the object in a second location, the second location being different than the start location, and a change in location being caused by the motion data;

determine a motion data score threshold that varies based on the motion data objective, wherein the motion data score threshold represents a defined amount value, a defined selection value, or a quantitative proximity value;

determine a motion data score based on the motion data, wherein the motion data score indicates a level of completion of the motion data objective by the motion data;

determine a promotion data parameter of a promotion based on satisfaction of the motion data score threshold and consumer account data associated with the consumer device, wherein the consumer account data is accessed from a consumer database and associated with the consumer device based on the consumer device providing login data to the central system via the network; and provide an electronic marketing communication of the promotion to the consumer device via the network.

2. The system of claim 1, wherein:
the motion data objective includes moving the object toward a goal represented in the consumer interface;
the motion data score indicates a distance of the object from the goal.

3. The system of claim 1, wherein:
the motion data objective includes moving the object to one of a plurality of selection options represented in the consumer interface;
the motion data score indicates whether the object has been moved one of the plurality of selection options.

4. The system of claim 1, wherein:
the motion sensor includes one or more of:
the six-axis gyroscope accelerometer; or
a three axis accelerometer;
the motion data indicates a directional motion of the consumer device; and
the object that is responsive to the motion data generated by the motion sensor moves within the consumer interface based on the directional motion of the consumer device.

5. The system of claim 4, wherein:
the motion data objective includes moving the object to one of a plurality of selection options represented in the consumer interface;
the motion data score indicates whether the object has been moved one of the plurality of selection options.

6. The system of claim 4, wherein:
the motion data objective includes moving the object one or more locations represented in a map display of the consumer interface; and
the motion data score indicates whether the object has been moved to the one or more locations.

7. The system of claim 1, wherein:
the motion sensor includes a six-axis gyroscope accelerometer; and
the motion data indicates a directional motion and a rotational motion of the consumer device; and
the object that is responsive to the motion data generated by the motion sensor moves within the consumer interface based on the directional motion and the rotational motion of the consumer device.

8. The system of claim 1, wherein the processing circuitry is further configured to:
determine the motion data score threshold that must be satisfied to complete the motion data objective;
determine whether the motion data score satisfies the motion data objective; and
subsequent to determining that the motion data score satisfies the motion data objective, provide the electronic marketing communication of the promotion to the consumer device via the network.

9. The system of claim 1, wherein the processing circuitry is further configured to:
determine second consumer account data based on the motion data; and
determine a second promotion data parameter associated with a second promotion based on the second consumer account data.

10. The system of claim 1, wherein the promotion data parameter defines one or more of:
an item associated with the promotion;
an accepted value of the promotion; or
a promotional value of the promotion.

11. A machine-implemented method, comprising:
generating, by processing circuitry of one or more servers configured to connect with a consumer device via a network, a consumer interface, the consumer interface configured to display an object on a virtual surface of the consumer interface at a start location of the consumer interface, a change in a location of the object being responsive to motion data, wherein the consumer device includes a motion sensor including one or more of:
a six-axis gyroscope accelerometer; or
a three axis gyroscope;
providing, by the processing circuitry and via the network, the consumer interface to the consumer device;
determining, by the processing circuitry, a motion data objective, the motion data objective being a new location to which the object can be moved to by generation of motion data,
wherein the motion data indicates a rotational motion of the consumer device, and
wherein the object that is responsive to the motion data generated by the motion sensor moves within the consumer interface based on rotational motion of the consumer device;
receiving, by the processing circuitry and via the network, the motion data from the consumer device, the motion data generated by a motion sensor of the consumer device while the consumer interface is being provided to the consumer device and while the consumer interface is being displayed on the consumer device;

provide, in real-time, visual feedback to the consumer device, the visual feedback responsive to the motion data, the visual feedback provided via the consumer interface, the providing of the visual feedback causing the consumer interface to display the object in a second location, the second location being different than the start location, and a change in location being caused by the motion data;

determining, by the processing circuitry, a motion data score threshold that varies based on the motion data objective, wherein the motion data score threshold represents a defined amount value, a defined selection value, or a quantitative proximity value;

determining, by the processing circuitry, a motion data score based on the motion data, wherein the motion data score indicates a level of completion of the motion data objective by the motion data;

determining, by the processing circuitry, a promotion data parameter of a promotion based on satisfaction of the motion data score threshold and consumer account data associated with the consumer device, wherein the consumer account data is accessed from a consumer database and associated with the consumer device based on the consumer device providing login data to the central system via the network; and providing, by the processing circuitry, an electronic marketing communication of the promotion to the consumer device via the network.

12. The method of claim 11, wherein:
the motion data objective includes moving the object toward a goal represented in the consumer interface;
the motion data score indicates a distance of the object from the goal.

13. The method of claim 11, wherein:
the motion data objective includes moving the object to one of a plurality of selection options represented in the consumer interface;
the motion data score indicates whether the object has been moved one of the plurality of selection options.

14. The method of claim 11, wherein:
the motion sensor includes one or more of:
the six-axis gyroscope accelerometer; or
a three axis accelerometer;
the motion data indicates a directional motion of the consumer device; and
the object that is responsive to the motion data generated by the motion sensor moves within the consumer interface based on the directional motion of the consumer device.

15. The method of claim 14, wherein:
the motion data objective includes moving the object to one of a plurality of selection options represented in the consumer interface;
the motion data score indicates whether the object has been moved one of the plurality of selection options.

16. The method of claim 14, wherein:
the motion data objective includes moving the object one or more locations represented in a map display of the consumer interface; and
the motion data score indicates whether the object has been moved to the one or more locations.

17. The method of claim 11, wherein:
the motion sensor includes a six-axis gyroscope accelerometer; and
the motion data indicates a directional motion and a rotational motion of the consumer device; and the object that is responsive to the motion data generated by the motion sensor moves within the consumer interface based on the directional motion and the rotational motion of the consumer device.

18. The method of claim 11 further comprising, by the processing circuitry:
determining the motion data score threshold that must be satisfied to complete the motion data objective;
determining whether the motion data score satisfies the motion data objective; and
subsequent to determining that the motion data score satisfies the motion data objective, providing the electronic marketing communication of the promotion to the consumer device via the network.

19. The method of claim 11 further comprising, by the processing circuitry:
determining second consumer account data based on the motion data; and
determining a second promotion data parameter associated with a second promotion based on the second consumer account data.

20. The method of claim 11, wherein the promotion data parameter defines one or more of:
an item associated with the promotion;
an accepted value of the promotion; or
a promotional value of the promotion.

21. A consumer device, comprising:
communication circuitry configured to connect with a central system via a network;
a motion sensor configured to generate motion data indicating motion of the consumer device,
wherein the motion sensor includes one or more of:
a six-axis gyroscope accelerometer; or
a three axis gyroscope;
a display device; and
processing circuitry configured to:
generate a consumer interface, the consumer interface configured to display an object on a virtual surface of the consumer interface at a start location of the consumer interface, change in a location of the object being responsive to the motion data;
provide the consumer interface, via a graphical user interface (GUI), to the display device;
determine a motion data objective, the motion data objective being a new location on the virtual surface to which the object can be moved to by the generation of the motion data, wherein the motion data indicates a rotational motion of the consumer device, and
wherein the object that is responsive to the motion data generated by the motion sensor moves within the consumer interface based on the rotational motion of the consumer device;
receive the motion data from the motion sensor, the motion data generated by a motion sensor of the consumer device while the consumer interface is being provided to the consumer device and while the consumer interface is being displayed on the consumer device;
provide, in real-time, visual feedback to the consumer device, the visual feedback responsive to the motion data, the visual feedback provided via the consumer interface, the providing of the visual feedback causing the GUI to display the consumer interface to display the object in a second location, the second location being different than the start location, and a change in location being caused by the motion data;

determine a motion data score threshold that varies based on the motion data objective, wherein the motion data score threshold represents a defined amount value, a defined selection value, or a quantitative proximity value;

determine a motion data score based on the motion data, wherein the motion data score indicates a level of completion of the motion data objective by the motion data;

provide, via the network, the motion data score to a central system; and subsequent to providing the motion data score to the central system, receive an impression of a promotion from the central system, the promotion defined by a promotion data parameter determined based on satisfaction of the motion data score threshold and consumer account data associated with the consumer device, wherein the consumer account data is accessed from a consumer database and associated with the consumer device based on the consumer device providing login data to the central system via the network.

* * * * *